United States Patent
Nishida et al.

(10) Patent No.: US 6,372,170 B1
(45) Date of Patent: Apr. 16, 2002

(54) MANUFACTURING METHOD FOR A SYNTHETIC RESIN HOLLOW MEMBER AND MANUFACTURING APPARATUS THEREFOR

(75) Inventors: Michinori Nishida; Shoso Nishida, both of Hiroshima (JP)

(73) Assignees: G P Daikyo Corporation, Higashihiroshima; The Japan Steel Works, Ltd., Tokyo, both of (JP)

( * ) Notice: Subject to any disclaimer, the term of this patent is extended or adjusted under 35 U.S.C. 154(b) by 0 days.

(21) Appl. No.: 09/323,959

(22) Filed: Jun. 2, 1999

(30) Foreign Application Priority Data

Jun. 2, 1998 (JP) ............................. 10-152810

(51) Int. Cl.$^7$ ..................... B29C 45/14; B29C 45/10; B29C 45/33
(52) U.S. Cl. ................ 264/255; 264/261; 264/297.2; 264/297.8; 425/123; 425/129.1; 425/572; 425/574
(58) Field of Search ................. 264/250, 255, 264/261, 263, 267, 297.2, 297.8; 425/574, 575, 129.1, 125, 134, 123, 572

(56) References Cited

U.S. PATENT DOCUMENTS

| | | | | |
|---|---|---|---|---|
| 4,261,947 | A | * 4/1981 | Ogi | 264/263 |
| 5,030,406 | A | * 7/1991 | Sorensen | 264/255 |
| 6,042,364 | A | * 3/2000 | Nishida | 264/255 |
| 6,210,619 | B1 | * 4/2001 | Owens | 264/255 |

FOREIGN PATENT DOCUMENTS

| | | |
|---|---|---|
| DE | 44 17 979 | 11/1995 |
| JP | 4-331117 | 11/1992 |
| JP | 4-331123 | 11/1992 |
| JP | 7-217755 | 8/1995 |

OTHER PUBLICATIONS

Patent Abstracts of Japan, Publication No. 08034032A, Feb. 6, 1996, abstract of K. Hiroshi et al., "Hollow Molded Product and Production Thereof".

* cited by examiner

Primary Examiner—Angela Ortiz
(74) Attorney, Agent, or Firm—Foley & Lardner

(57) ABSTRACT

A method for manufacturing a synthetic resin hollow member wherein using a die slide injection molding machine comprising a stationary die having a series of molding portions formed lengthwise in male-female-female-male sequence, and a movable die having a series of molding portions formed lengthwise in female-male-female sequence, the manufacturing method comprising the following steps: a die clamping step; an injection step for molding two half bodies for the present cycle in a male/female combination of molding portions and joining two half bodies from preceding cycle in a combination of female molding portions; a removal step for opening the dies and removing the finished hollow member; a die sliding step for sliding the dies lengthwise a specific distance relative to each other in a reverse direction of that in the previous cycle; these steps are then repeated to manufacture one hollow member with each die sliding step.

6 Claims, 16 Drawing Sheets

MANUFACTURING METHOD FOR A SYNTHETIC RESIN HOLLOW MEMBER AND MANUFACTURING APPARATUS THEREFOR

BACKGROUND OF THE INVENTION

1. Field of the Invention

The present invention relates to a method and an apparatus for manufacturing a synthetic resin hollow member by bringing a pair of synthetic resin molding half bodies into abutment each other and joining the resin-made half bodies together at their abutting portions, also relates to a method and an apparatus for manufacturing a synthetic resin hollow member with a filter (filtering material) or other intermediate element incorporated therein.

2. Description of Related Art

Conventionally, as a method for manufacturing a synthetic resin hollow member, as disclosed in, for example, Japanese Patent Application Laid-Open Publication (Kokai) No.7-217755, there is a known method utilizing the so-called "die slide injection (DSI) method" wherein a die assembly including a pair of dies is used such that one of the dies has a male molding portion and a female molding portion for molding one separate half body and the other die has a female molding portion and a male molding portion provided in opposed relation to the molding portions of the one die, and wherein after separate half bodies are simultaneously molded by using the die assembly (first injection), one of the dies is caused to slide relative to the other die so that separate half bodies left in the respective female molding portions are brought into abutment with each other before die clamping, with a molten resin being injected onto peripheral edges of the abutting portions (second injection) to join the two half bodies together.

According to this DSI method, productivity can be considerably enhanced over the conventional method in which molding of separate half bodies and abutting/joining of the half bodies are performed in completely separate processes. Also, the DSI method more reliably assures bond strength and a positive seal at the joint when compared with conventional methods of bonding the half bodies with adhesive or by heat fusion.

The DSI method can also be used to efficiently manufacture a synthetic resin hollow member with a filter (filtering material) or other intermediate element inside the finished product. In this case, after the synthetic resin hollow member is molded by the first injection as described in the above prior art, die opening is carried out once for insertion of a separately made intermediate element into one of the half bodies, after which the sliding and clamping of the dies are performed, the second injection is carried out.

In the DSI method, generally, a pair of male molding portion and female molding portion is provided in relative sliding direction on each die, and a single hollow member is obtained with every two die sliding operations. However, as a method for further improvement of the productivity in the DSI method, for example, in Japanese Patent Application Laid-Open Publication (Kokai) No.4-331117 or No.4-331123, there is disclosed the so-called "double DSI method" wherein a set of male molding portion and female molding portions is provided in parallel (that is, plural rows are placed perpendicular to the die sliding direction) in each die.

According to this plural rows type (double) DSI method, one hollow member is obtained with each die sliding operation, and thus further improvement of productivity is achieved.

A problem with this conventional double DSI method is that the width of the die (that is, the dimension perpendicular to the die sliding direction) is unavoidably increased by disposing plural rows of molding portion pairs in each die, and more space is therefore required in this direction. Furthermore, this problem is even greater when the product being manufactured is long in this lateral direction.

Molding machine size is also related to the die width, and an increase in die width tends to increase production equipment cost and the cost of production. It is therefore necessary and desirable to keep the dies as small as possible so that the smallest possible molding machines can be used for production.

Also, when a synthetic resin hollow member with an intermediate element incorporated therein is manufactured using this DSI process, as described above, the intermediate element manufactured in a separate process is placed in one of the half bodies, after the first injection step and before the second injection step. This obviously means that a manufacturing process completely separate from that in which the hollow member half bodies are molded, mated, and bonded is required to manufacture the intermediate element incorporated into the hollow member. The separately manufactured intermediate elements must also be separately inventoried and managed, thus further complicating cost reduction efforts. Differences between half bodies molded in the first injection step and the intermediate element manufactured by the separate process, in molding conditions, temperature when the intermediate element is inserted into one of the half bodies, and other conditions also make it difficult to improve assembly characteristics and precision of the intermediate element assembled into the half bodies.

Another problem occurs when manufacturing two similar synthetic resin hollow bodies that have the same function and basic size and differ only partly in shape or orientation, such as right and left handed components. Conventional methods require dies that differ only in part, and the components are also manufactured in different production lots.

It will be obvious that die costs could be held down and production control significantly simplified if such nominally different products could be manufactured using the same dies as part of the same production lot.

It is therefore an object of the present invention to provide a method and an apparatus for manufacturing a synthetic resin hollow member whereby: an increase in die width is not incurred; one hollow member can be obtained with each die sliding operation; intermediate elements can be molded as part of the process for molding, mating, and bonding hollow member half bodies; or two different hollow bodies can be obtained using the same dies.

SUMMARY OF THE INVENTION

To achieve the above object, a method according to a first aspect of the present invention for manufacturing a synthetic resin hollow member bringing a pair of synthetic resin-made half bodies into abutment each other and joining these half bodies together at their abutting portions uses a molding apparatus for a die slide injection molding and comprises steps as described below. This molding apparatus more specifically comprises a first die having formed lengthwise thereto a series of molding portions in male-female-female-male sequence with a specific spacing therebetween, and a second die having formed lengthwise thereto a series of molding portions in female-male-female sequence with a specific spacing therebetween. The dies can be mutually opened/closed, and can be slid lengthwise a specific pitch relative to each other.

The steps of this manufacturing method include a die clamping step for closing and clamping the first and second dies. An injection step following the die clamping step forms first and second molding half bodies for a present cycle in a combination of male and female molding portions by injecting molten resin to a cavity formed between the dies, and joins first and second molding half bodies from a preceding cycle in a combination of female molding portions by injecting molten resin to their abutting portions. A removal step following the injection step opens the first and second dies and removes a hollow member formed by bonding half bodies from the previous cycle. A die sliding step following the injection step slides the first and second dies lengthwise a specific distance relative. to each other in a direction opposite that in which the dies were slid in the previous cycle. These steps are then repeated to manufacture one hollow member of bonded first and second half bodies each time the dies are slid relative to each other.

A molding apparatus used in this method for manufacturing a synthetic resin hollow member by bringing a pair of synthetic resin-made half bodies into abutment each other and joining the matched half bodies at their abutting portions, comprises a first die having formed lengthwise thereto a series of molding portions in male-female-female-male sequence with a specific spacing therebetween, and a second die having formed lengthwise thereto a series of molding portions in female-male-female sequence with a specific spacing therebetween. A die opening means opens and closes the first and second dies to each other, and a sliding means slides the first and second dies lengthwise a specific distance relative to each other. An injection means injects molten resin to a plurality of molding cavities formed between the closed first and second dies. Thus comprised, first and second half bodies for the present cycle are injection molded in a combination of male and female molding portions, and a hollow member is formed in a combination of female molding portions by bonding first and second molding half bodies from a preceding cycle by injecting molten resin to their abutting portions. As a result, a hollow member is yielded at each relative sliding operation of the first and second dies.

A manufacturing method according to another version of the invention is for manufacturing a synthetic resin hollow member having an intermediate element assembled therein by bringing a pair of synthetic resinmade half bodies into abutment each other after disposing the intermediate element therebetween, and then joining the matched half bodies at their abutting portions therebetween using a die slide injection molding apparatus. This molding apparatus comprises a first hollow member die having formed lengthwise thereto a series of molding portions in male-female-female-male sequence with a specific spacing therebetween; a first intermediate element die having an intermediate element molding portion and disposed at an end of the first hollow member die; a second hollow member die having formed lengthwise thereto a series of molding portions in female-male-female sequence with a specific spacing therebetween; and a second intermediate element die having an intermediate element molding portion and disposed at an end of the second hollow member die. The first and second hollow member dies can be mutually opened/closed and slid lengthwise a specific distance relative to each other. The first and second intermediate element dies are openable and closable to each other but are not slideable.

This manufacturing method comprises a die clamping step for closing and clamping the first and second hollow member dies and first and second intermediate element dies, respectively. An injection step following the die clamping step injects molten resin to a cavity formed between the hollow member dies and intermediate element dies respectively, thereby forming first and second molding half bodies for a present cycle in a combination of male and female molding portions, and an intermediate element for the present cycle in a cavity formed between the intermediate element dies, and bonding first and second molding half bodies from a preceding cycle in a combination of female molding portions by injecting molten resin to their abutting portions.

A removal step follows the first injection step to open the hollow member dies and remove the hollow member formed by the bonded hollow member half bodies from the previous cycle after first assembling therebetween an intermediate element from the previous cycle. An intermediate element assembly process then follows to place an intermediate element molded for the present cycle to either the first or second hollow member half for the present cycle. Next, a die sliding step slides the first and second hollow member dies lengthwise a specific distance relative to each other in a direction opposite that in which the dies were slid in the previous cycle. These steps are then repeated to manufacture one hollow member by bonding first and second half bodies with an intermediate element assembled therebetween each time the dies are slid relative to each other.

A molding apparatus for manufacturing a synthetic resin hollow member having a separate intermediate element incorporated therein by bringing a pair of synthetic resin-made half bodies after inserting the intermediate element therebetween, and then bonding the matched half bodies at their abutting portions therebetween, comprises a first hollow member die having formed lengthwise thereto a series of molding portions in male-female-female-male sequence with a specific spacing therebetween, a first intermediate element die having an intermediate element molding portion and disposed at an end of the first hollow member die, a second hollow member die having formed lengthwise thereto a series of molding portions in female-male-female sequence with a specific spacing therebetween, and a second intermediate element die having an intermediate element molding portion and disposed at an end of the second hollow member die. A die opening and closing means opens and closes, respectively, the first and second hollow member dies and first and second intermediate element dies to each other, and a sliding means slides the hollow member dies lengthwise a specific distance relative to each other while holding the intermediate element dies without sliding. An injection means injects molten resin to a plurality of molding cavities formed between the closed dies.

Thus comprised, with each relative sliding operation of the dies: first and second molding half bodies are injection molded in a combination of male and female molding portions for the present cycle; an intermediate element is injection molded for the present cycle in the intermediate element dies; and a hollow member is formed in registered female molding portions by bonding first and second molding half bodies formed in the preceding cycle and combined for the present cycle by injecting molten resin to abutting portions of the combined first and second molding half bodies. As a result, an intermediate element is assembled between first and second half bodies, which are then are bonded to yield a hollow member, at each sliding operation of the hollow member dies.

A further manufacturing method according to the present invention manufactures two different synthetic resin hollow member moldings using a single die slide injection molding apparatus. The injection molding apparatus in this method uses a first die having formed lengthwise thereto a series of molding portions in male-female-female-male sequence with a specific spacing therebetween, and a second die having formed lengthwise thereto a series of molding portions in female-male-female sequence with a specific spacing therebetween. The dies can be mutually opened/closed and slid lengthwise a specific distance relative to each other.

The manufacturing method comprises a first die clamping step for closing and clamping the first and second dies. A first injection step following the first die clamping step molds third and fourth molding half bodies for the present cycle in a combination of male and female molding portions by injecting molten resin to a cavity formed between the dies, and bonds first and second molding half bodies formed in the preceding cycle and combined in registered female molding portions for the present cycle by injecting molten resin to abutting portions of the combined first and second molding half bodies. A first removal step following the first injection step opens the dies and removes a first hollow member formed by bonding the first and second half bodies from the previous cycle. A first die sliding step slides the dies lengthwise a specific distance relative to each other in a direction opposite that in which the dies were slid in the previous cycle. A second die clamping step closes and clamps the first and second dies after the first die sliding step. A second injection step following the second die clamping step molds first and second molding half bodies for the present cycle in a combination of male and female molding portions by injecting molten resin to a cavity formed between the dies, and bonds third and fourth molding half bodies formed in the preceding cycle and combined in registered female molding portions for the present cycle by injecting molten resin to abutting portions of the combined third and fourth molding half bodies. A second removal step following the second injection step opens the dies and removes a second hollow member formed by bonding the third and fourth half bodies from the present cycle. A second die sliding step slides the dies lengthwise a specific distance relative to each other in a direction opposite that in which the dies were slid in the previous cycle. These steps are then repeated to sequentially manufacture one hollow member of bonded first and second half bodies and one hollow member of bonded third and fourth half bodies every two times the dies are slid relative to each other.

A molding apparatus for this manufacturing method more specifically comprises a first die having formed lengthwise thereto a series of molding portions in male-female-female-male sequence with a specific spacing therebetween, and a second die having formed lengthwise thereto a series of molding portions in female-male-female sequence with a specific spacing therebetween where the center male molding portion can be used in combination with the two center female molding portions in the first die. A mold opening means opens and closes the first and second dies to each other, and a sliding means slides the first and second dies lengthwise a specific distance relative to each other. An injection means injects molten resin to a plurality of molding cavities formed between the closed first and second dies.

Thus comprised, a first injection molding step and a second injection molding step are performed at every two relative sliding operations of the first and second dies. The first injection molding step molds third and fourth molding half bodies for the present cycle in a combination of male and female molding portions by injecting molten resin to a cavity formed between the dies, and bonds first and second molding half bodies formed in the preceding cycle and combined in registered female molding portions for the present cycle by injecting molten resin to a bonding interface between the combined first and second molding half bodies. The second injection step molds first and second molding half bodies for the present cycle in a combination of male and female molding portions by injecting molten resin to a cavity formed between the dies, and bonds third and fourth molding half bodies formed in the present cycle and combined in registered female molding portions for the present cycle by injecting molten resin to a bonding interface between the combined third and fourth molding half bodies. As a result, every two relative sliding operations of the first and second dies yields a first hollow member of bonded first and second half bodies, and a second hollow member of bonded third and fourth half bodies.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

Embodiment 1

A first embodiment of the present invention is described below using by way of example the manufacture of a three-way joint made from synthetic resin.

Figure 1:
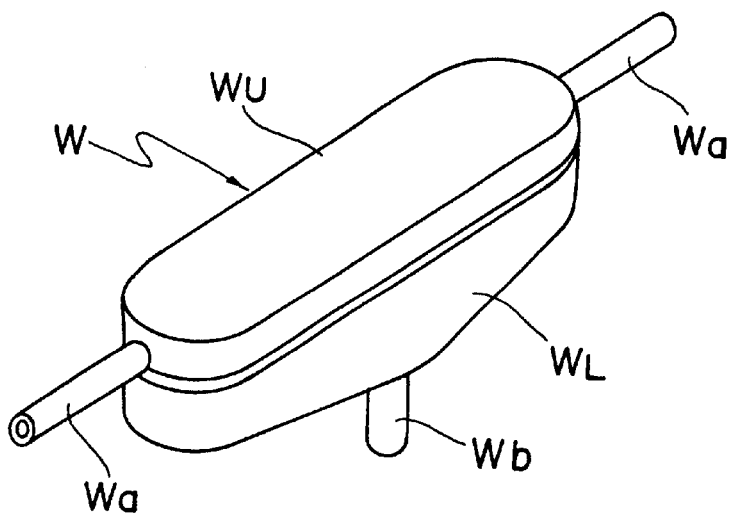
FIG. 1 is a perspective view of a three-way joint according to a first preferred embodiment of the present invention.
Figure 2:
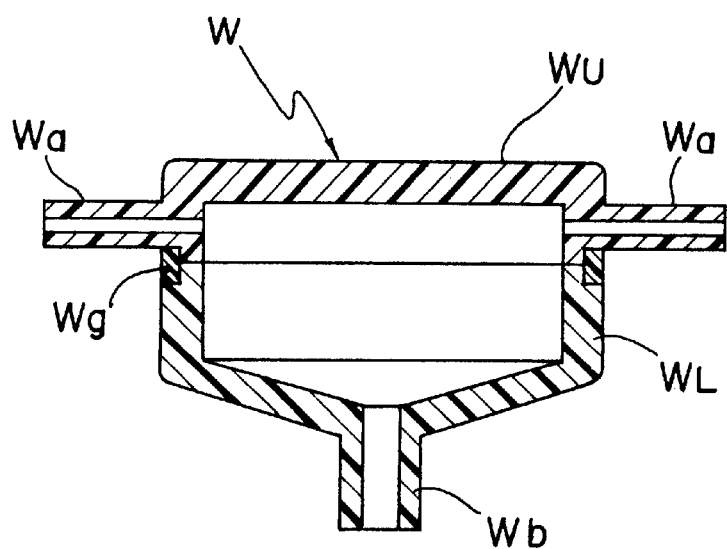
FIG. 2 is a section view of the three-way joint shown in FIG. 1.

FIG. 1 and FIG. 2 are a perspective and section view, respectively, of a three-way joint W as exemplary of a synthetic resin hollow member according to this preferred embodiment of the present invention. It should be noted that this three-way joint W or hollow member may also be referred to as the "work" or "molding" below.

As shown in these figures, this three-way joint W is a hollow member formed by mating an upper half Wu having two opposing branches Wa with a lower half WL having one branch Wb such that a cavity is formed inside. As will be described in detail below, this three-way joint W is produced using a so-called die slide injection (DSI) molding, or die slide, process whereby both upper and lower half bodies Wu and WL are formed, brought into abutment each other, and joined together inside the dies in a single molding machine to obtain a hollow member.

As will be known from FIG. 2, a U-shaped channel Wg is preferably formed to the outside circumference of the abutting surfaces of the upper and lower half bodies Wu and WL, preferably by wall sections of the upper and lower half bodies Wu and WL. During molding, the open side of this channel is closed by the die wall, thereby forming a resin channel that is closed on all sides.

As a result, resin (secondary resin) for bonding the upper and lower half bodies Wu and WL can be filled to this resin channel after the upper and lower half bodies Wu and WL are brought into abutment each other in the dies.

A method according to the present invention for manufacturing this three-way joint W, and the construction of a molding machine for a die slide injection (DSI) process used in this preferred method, are described next below.

Figure 3:
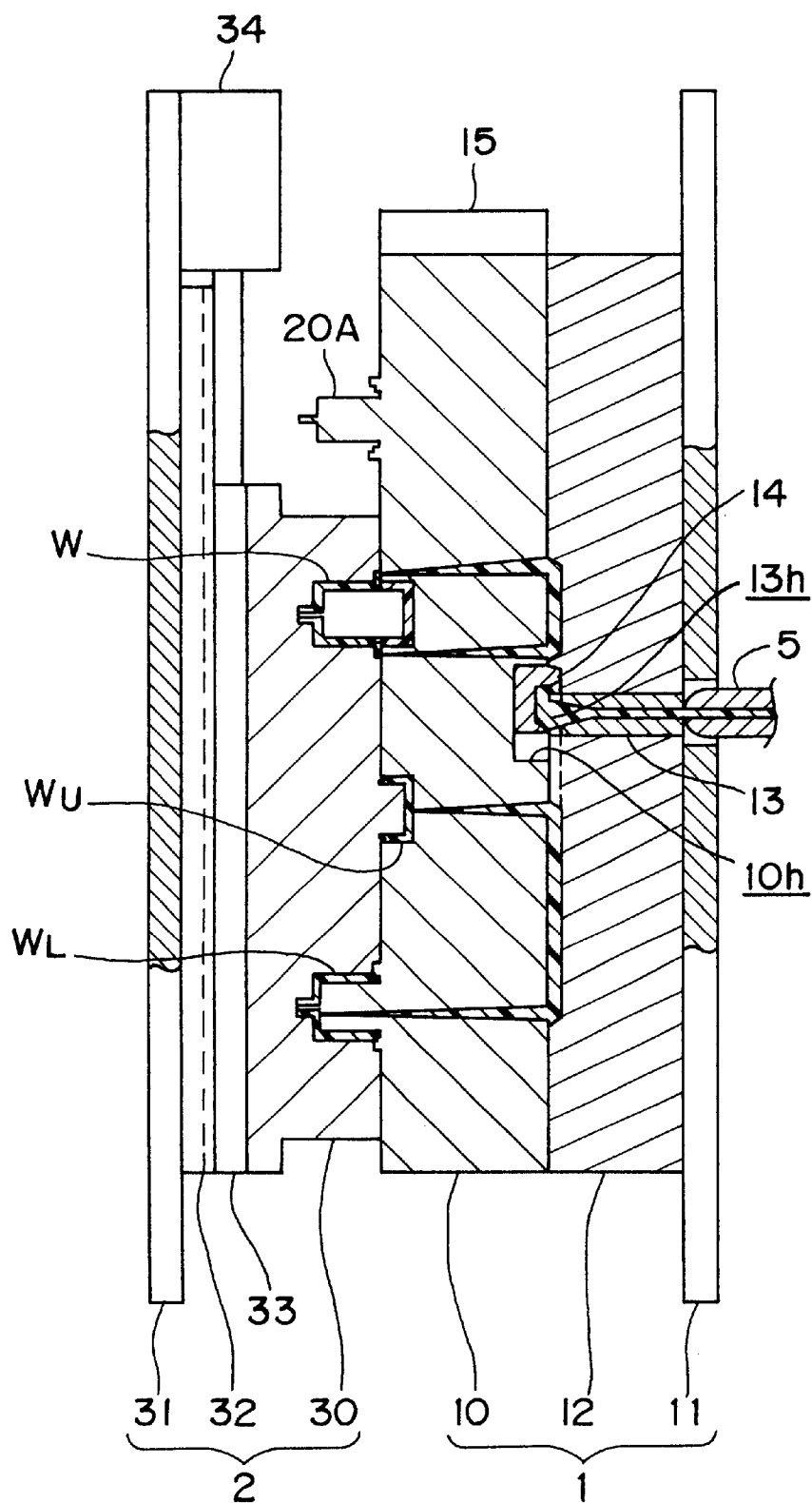
FIG. 3 is a section view of a molding machine at a first die clamping stage and a first injection molding stage in a molding sequence for the three-way joint shown in FIG. 1.
Figure 4:
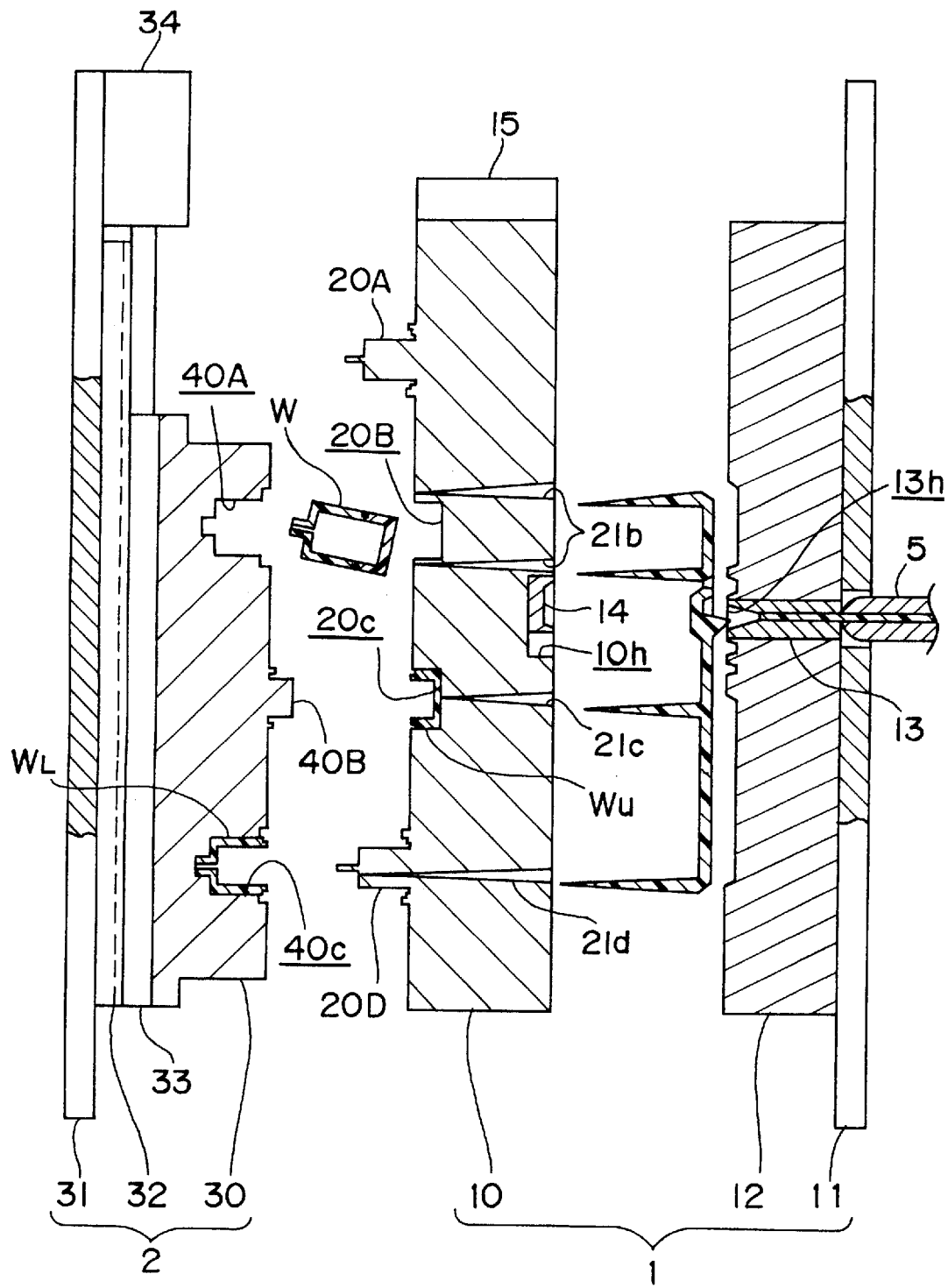
FIG. 4 is a section view of a molding machine at a first ejection stage in a molding sequence for the three-way joint shown in FIG. 1.
Figure 5:
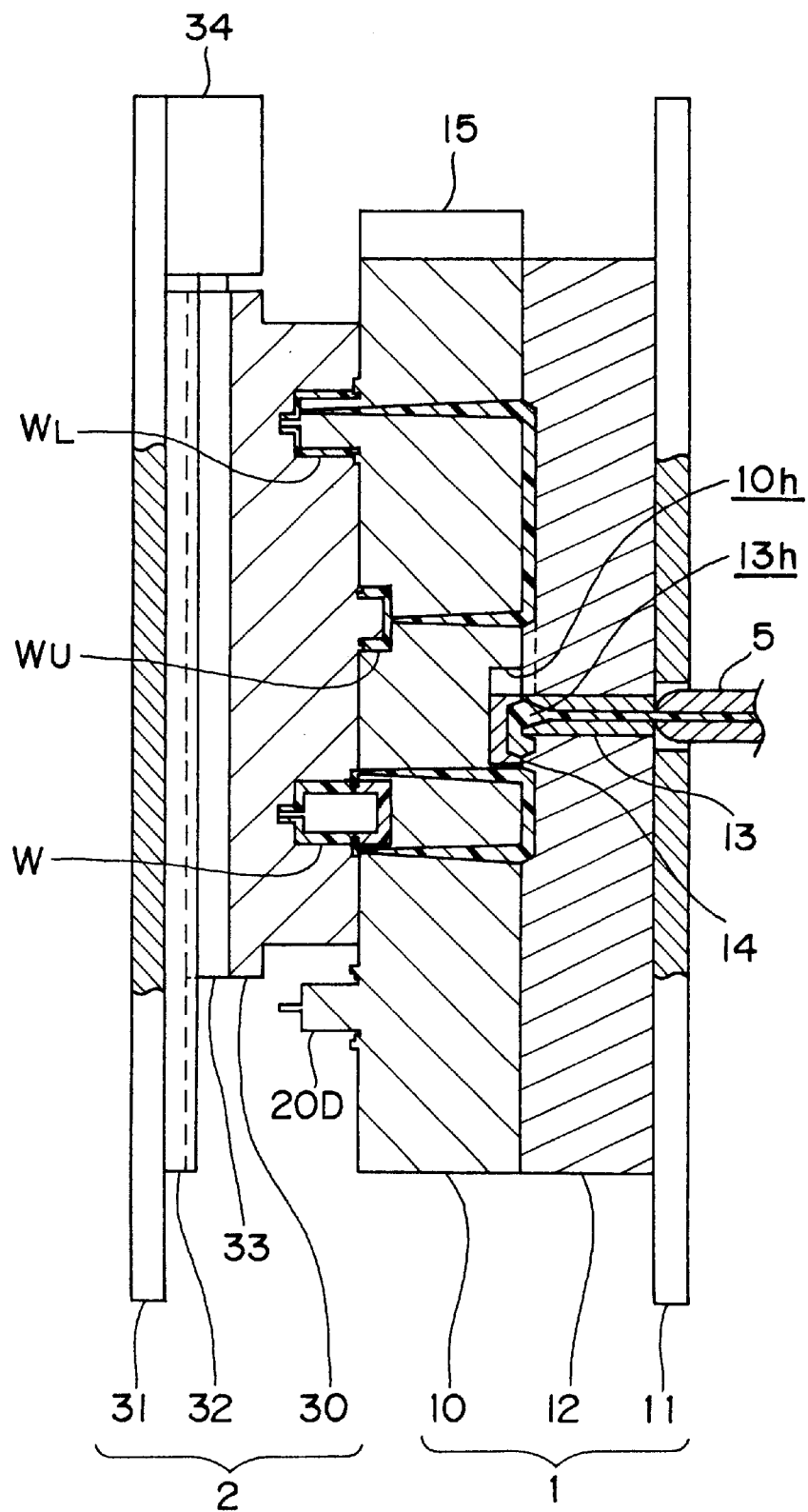
FIG. 5 is a section view of a molding machine at a second die clamping stage and a second injection molding stage in a molding sequence for the three-way joint shown in FIG. 1.
Figure 6:
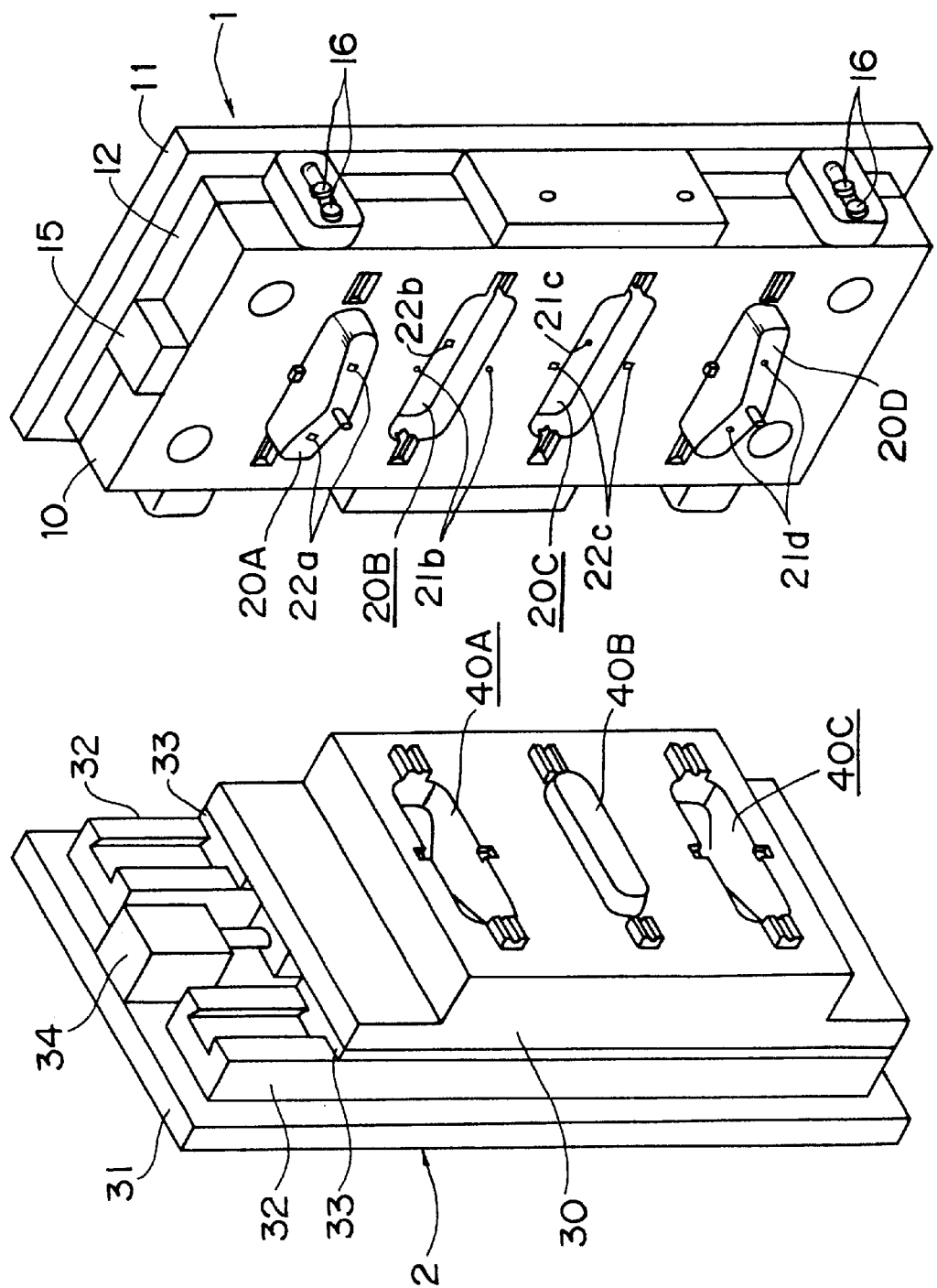
FIG. 6 is a perspective view of stationary die and a movable die according to a first embodiment of the present invention.

FIGS. 3 to 5 are section views of a molding machine at various stages in a molding sequence for the above-described three-way joint W. FIG. 6 is a perspective view for describing the die surfaces of a molding die used in the above molding machine. As will be known from these figures, a molding machine according to this preferred embodiment comprises a stationary die 1 to which the injection head 5 of the molding machine is connected, and a movable die 2 that opens and closes and slides lengthwise to the stationary die 1.

It should be noted that this stationary die 1 and movable die 2 respectively correspond to the first die and second die described in the accompanying claims. Furthermore, the stationary die 1 and movable die 2 are shown positioned horizontally to each other, that is, side by side, in FIG. 3 to FIG. 5, but the invention shall obviously not be so limited to this arrangement. For example, when actually installed in the molding machine (not shown in the figures), the molds 1 and 2 can be positioned vertically to each other, that is, one above the other.

The stationary die 1 comprises a platen 10 in the surface (registration surface) side of which are disposed molding portions as described below; a base plate 11 disposed parallel to the platen 10; a middle support platen 12 positioned between the base plate 11 and platen 10, and fixed to a surface side (a side opposing to the platen 10) of the base plate 11; and a sprue bushing 13 fixed in the center portion of the middle support platen 12 and base plate 11. The injection head 5 of the molding machine is fixed to this sprue bushing 13.

A recess 10h is formed in the center portion on the back of the platen 10, that is, the side facing the middle support platen 12. A change-over block 14 for changing the resin path to the molding portions in the platen 10 is disposed in this recess 10h as described below. The change-over block 14 is driven up and down as seen in the figures by a cylinder equipment 15 (block drive cylinder) disposed at the upper end of the platen 10. The block drive cylinder 15 is connected to receive signals from the control panel of the molding machine, and driving the block drive cylinder 15 is thus controlled according to a control signal from the control panel.

The movable die 2 similarly comprises a platen 30 in the surface (registration surface) side of which are disposed molding portions as described below; a base plate 31 disposed parallel to the platen 30; and a pair of slide rails 32 fixed to the surface side (the side opposing to the platen 30) of the base plate 31 opposing the platen 30. A pair of sliders 33 fit to slide freely in the slide rails 32 is fixed to the back of the platen 30 opposing the base plate 31.

A cylinder equipment 34 (platen drive cylinder) for driving the platen 30 up and down as seen in the figures is fixed at the top of the base plate 31. When this platen drive cylinder 34 is operated, the platen 30 slides a specific distance lengthwise, that is, up and down in this preferred embodiment as seen in the figures, to the base plate 31 with the sliders 33 thereof guided by the slide rails 32.

The platen drive cylinder 34 is likewise connected to receive signals from the control panel of the molding machine, and driving the platen drive cylinder 34 is thus controlled according to a control signal from the control panel.

The base plate 31 of the movable die 2 is linked to a hydraulic drive means (not shown in the figures), for example. This drive means is connected to receive signals from the control panel of the molding machine so that at a specific timing determined by a received control signal the movable die 2 can be opened and closed relative to the stationary die 1 while held parallel to the stationary die 1.

Four molding portions 20A to 20D are disposed in the registration surface of the stationary die platen 10 in series at a specific equal interval along the sliding direction (vertical direction) of the dies. Note that as shown in FIG. 6, these molding portions 20A to 20D are arranged horizontally on the registration surface of the platen 10, respectively.

Note, further, that of these four molding portions, the top and bottom molding portions 20A and 20D are male molding portions convexly shaped, and the other two molding portions 20B and 20C are female molding portions concavely shaped. In other words, two male molding portions 20A and 20D and two female molding portions 20B and 20C are disposed in male-female-female-male sequence at specific intervals lengthwise (that is, vertically as shown in the accompanying figures) to the registration surface of the stationary die platen 10.

Three molding portions 40A to 40C are similarly disposed in the registration surface of the movable die platen 30 in series at a specific equal interval along the sliding direction (vertical direction) of the dies. As with the molding portions 20A to 20D in the stationary die 1, these molding portions 40A to 40C are arranged horizontally on the registration surface of the platen 30, respectively.

Furthermore, of these three molding portions, the top and bottom molding portions 40A and 40C are female molding portions concavely shaped, and the remaining middle molding portion 40B is a male molding portion convexly shaped. In other words, two female molding portions 40A and 40C and one male molding portion 40B are disposed in female-male-female sequence at specific intervals lengthwise (that is, vertically as shown in the accompanying figures) to the registration surface of the movable die platen 30.

The interval between each of the molding portions 40A to 40C on the movable die 2 is the same as the interval between each of the molding portions 20A to 20D in the stationary die 1. In addition, the longitudinal sliding distance of the movable die platen 30 on the base plate 31 is equal to this interval between the molding portions 40A to 40C.

Two route of resin paths, first and second resin paths 21 and 22, are also disposed in the middle support platen 12 of stationary die 1 on the surface thereof opposite the platen 10 (see FIG. 7 to FIG. 10). The first resin path 21 comprises three branch paths 21B to 21D and a source path 21S. The branch paths 21B to 21D correspond to three of the four molding portions in the platen 10, that is, the three lowest parts 20B to 20D as seen in the figures, excluding the top molding portion 20A. The source path 21S extends to near opening 13h (resin supply opening) in the sprue bushing 13. End channels 21b to 21d passing through the platen 10 to the surface of the molding portions 20B to 20D are connected to the branch paths 21B to 21D.

The second resin path 22 comprises three branch paths 22A to 22C and source path 22S. These branch paths 22A to 22C also correspond to three of the four molding portions in the platen 10, that is, the three top parts 20A to 20C as seen in the figures, excluding the bottom molding portion 20D. The source path 22S likewise extends to near resin supply opening 13h. End channels 22a to 22c passing through the platen 10 to the surface of the molding portions 20A to 20C are connected to the branch paths 22A to 22C.

The change-over block 14 is moved up and down to connect the resin supply opening 13h to either source path 21S or 22S so that resin can be injected to one of the two resin paths 21 and 22. When the change-over block 14 is in the up position as indicated in FIG. 3, FIG. 7, and FIG. 8, the resin supply opening 13h is connected to the source path 21S for the first resin path 21, and molten resin can be supplied to the first resin path 21.

Figure 9:
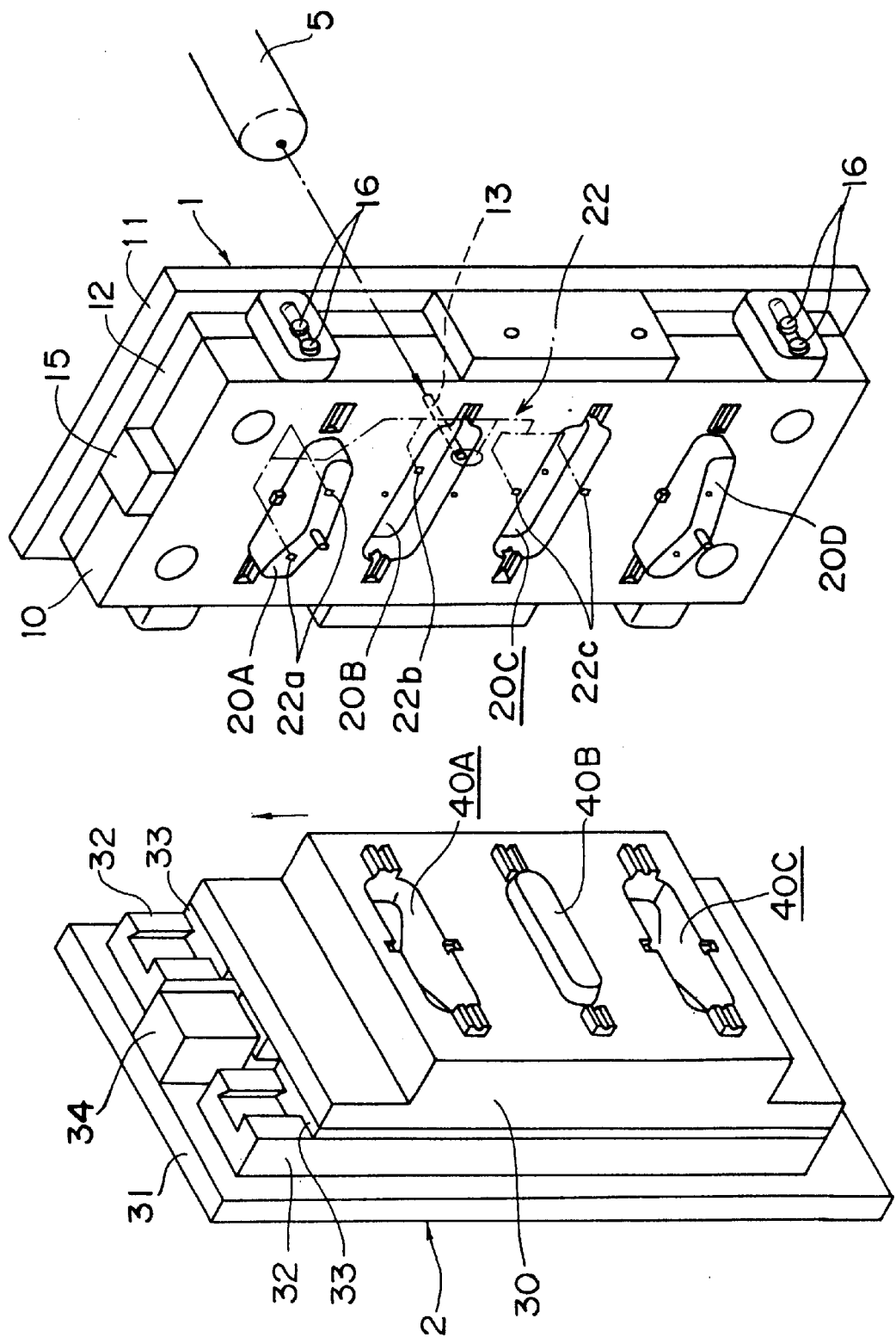
FIG. 9 is a perspective view showing the resin path of stationary die and a movable die in the second injection molding stage according to a first embodiment of the present invention.
Figure 10:
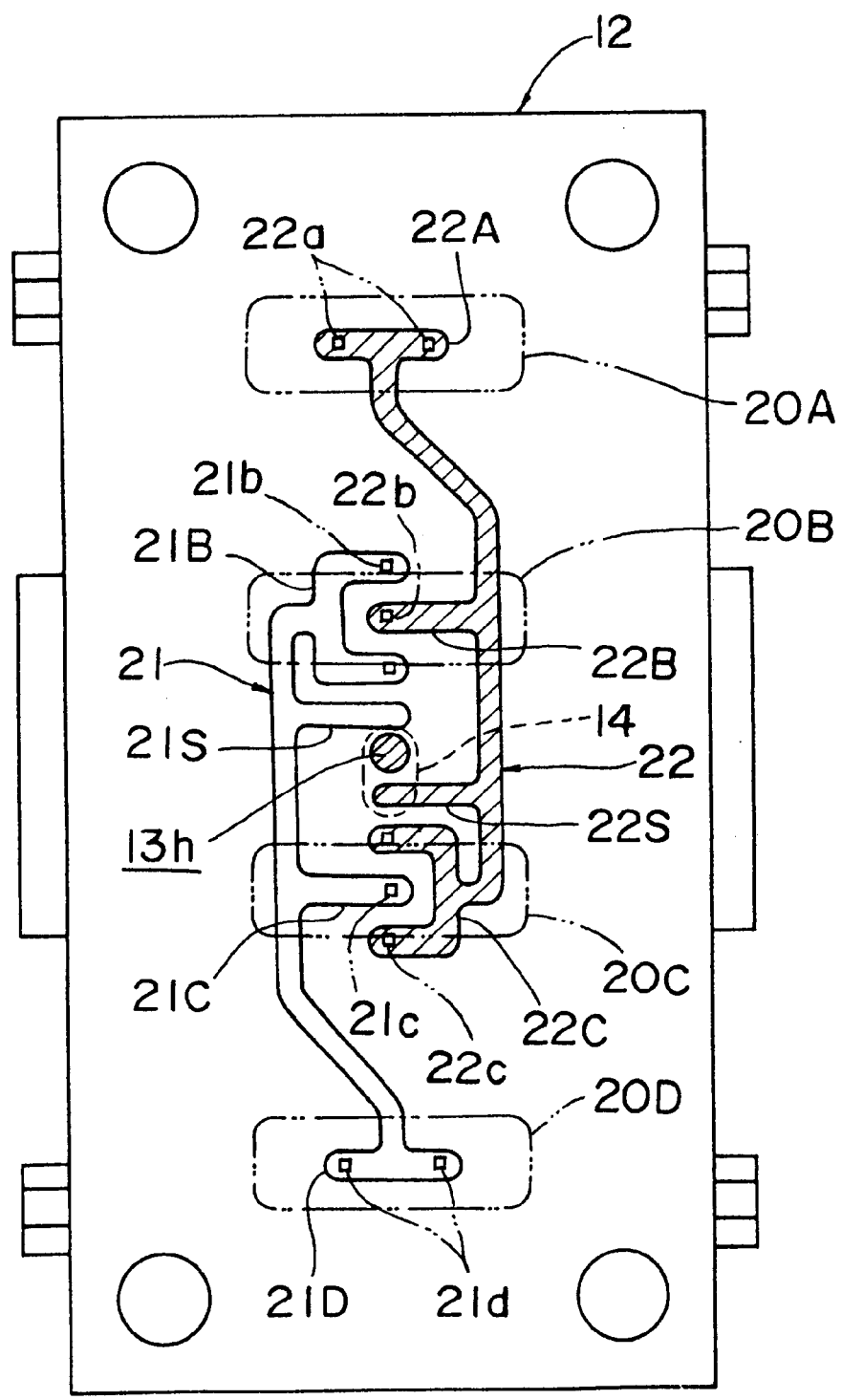
FIG. 10 is a plan view showing the resin path of the middle support platen of the stationary die in the second injection molding stage according to a first embodiment of the present invention.

By then operating the block drive cylinder 15 from this position to move the change-over block 14 in the recess 10h in platen 10 to the down position as indicated in FIG. 5, FIG. 9, and FIG. 10, the resin supply opening 13h is connected to the source path 22S of the second resin path 22, and the resin path is thus changed over to supply molten resin into the second resin path 22.

A molding process for manufacturing a three-way joint W using the above-described molding machine is described next below.

Figure 7:
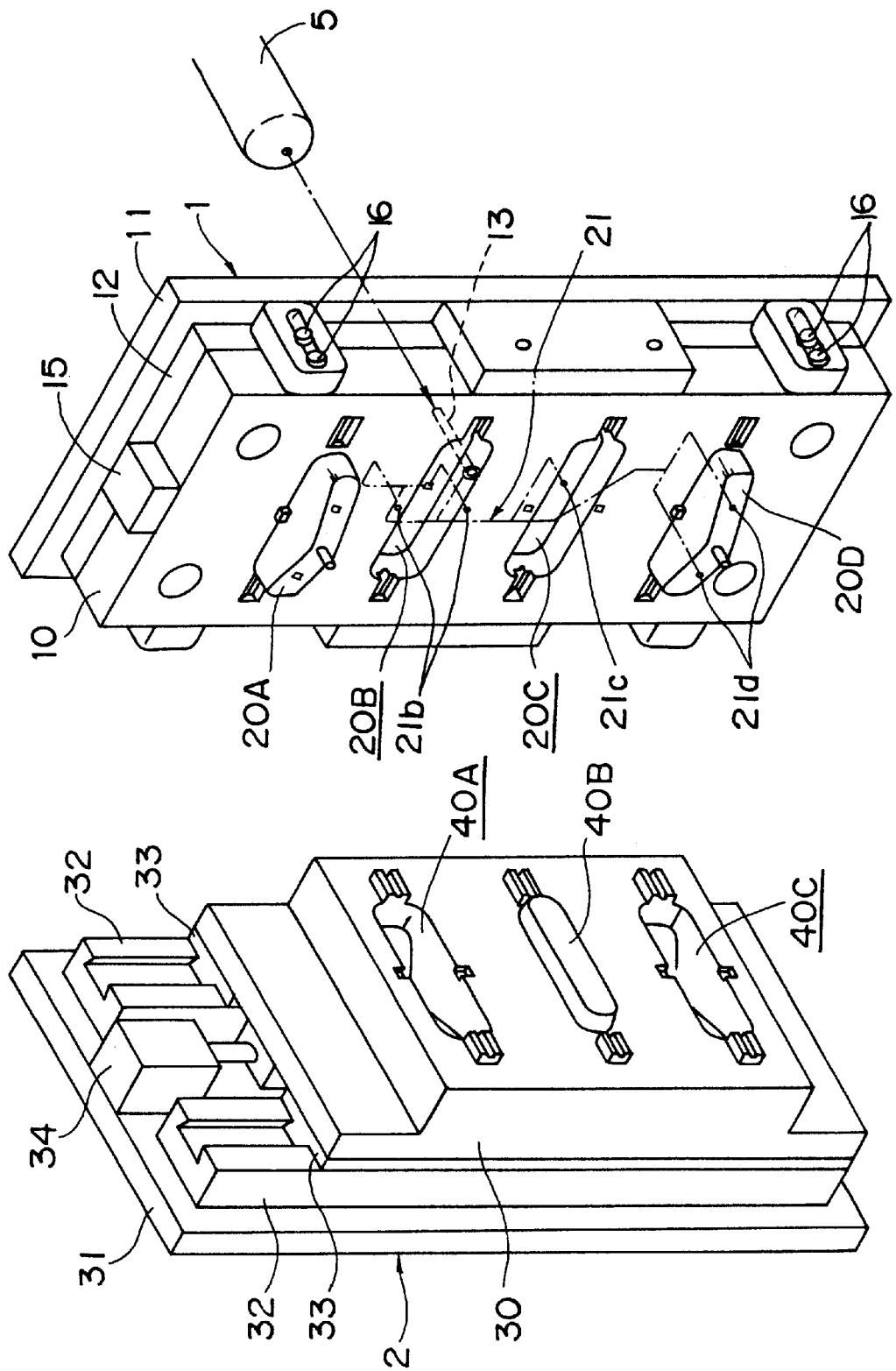
FIG. 7 is a perspective view showing the resin path of stationary die and a movable die in the first injection molding stage according to a first embodiment of the present invention.
Figure 8:
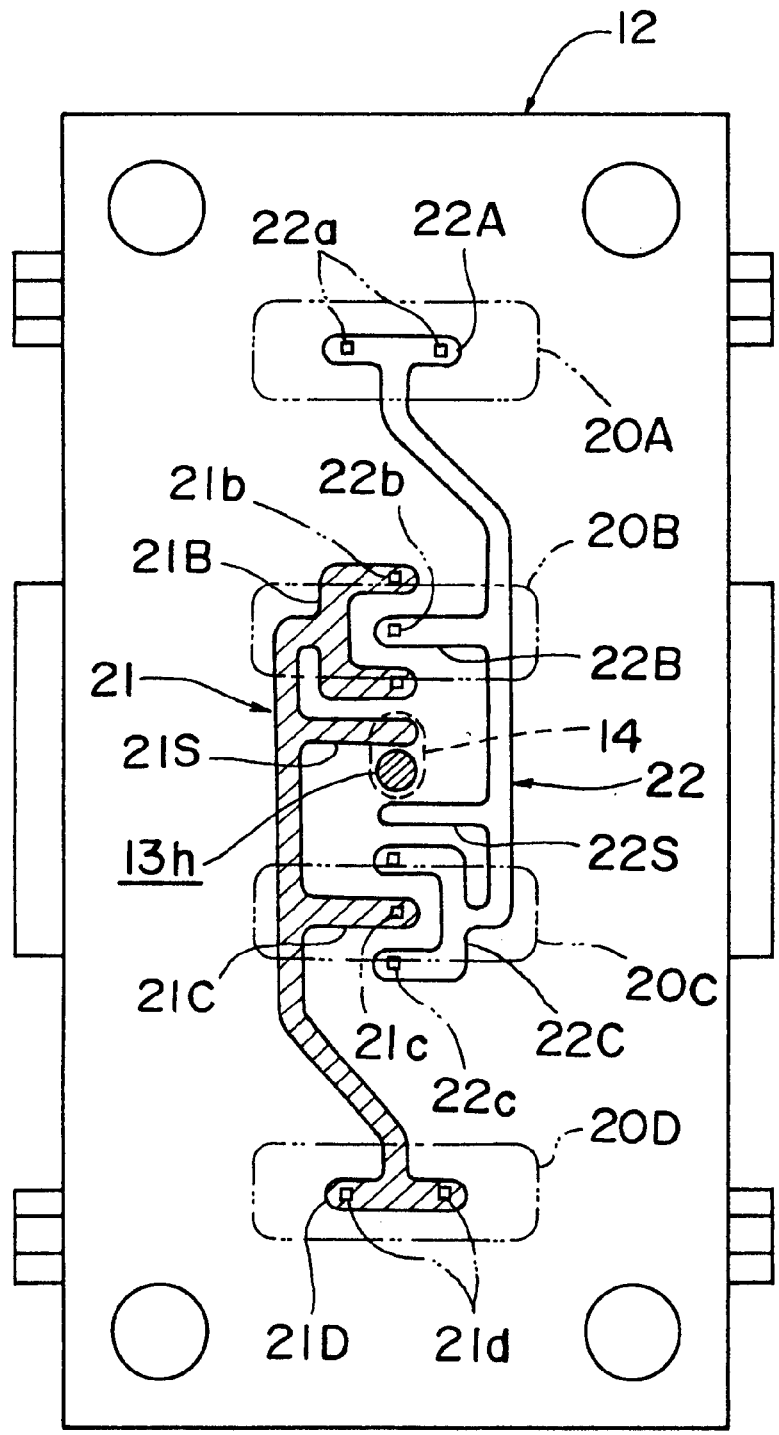
FIG. 8 is a plan view showing the resin path of the middle support platen of the stationary die in the first injection molding stage according to a first embodiment of the present invention.

At the start of this process as seen in FIG. 7, the platen 30 of movable die 2 is positioned at the bottom of the base plate 31 (the "down position" below), and as seen in FIG. 3, the movable die 2 is closed and clamped to the stationary die 1 (first die clamping). The molding portions of the stationary die 1 and movable die 2 are thus combined forming resulting molding cavities as described below.

As a result of this first die clamping, the following cavities are formed between the stationary die 1 and movable die 2. Specifically:

between movable die female molding portion 40A and stationary die female molding portion 20B: a cavity for combining upper and lower half bodies Wu and WL;

between movable die male molding portion 40B and stationary die female molding portion 20C: a molding cavity for upper half Wu;

between movable die female molding portion 40C and stationary die male molding portion 20D: a molding cavity for lower half WL.

A lower half WL held in the female molding portion 40A of movable die 2 and an upper half Wu held in the female molding portion 20B of stationary die 1 are thus combined in the cavity formed by movable die female molding portion 40A and stationary die female molding portion 20B. Molten resin is then injected and filled to the channel Wg around these molding portions to produce the finished product W. It should be noted that both half bodies Wu and WL combined in this cavity were formed in the previous molding cycle.

It should be further noted that for the first injection process at the start of production there are no moldings in this cavity. A dummy having the same shape as the mated upper and lower half bodies Wu and WL is therefore inserted to the cavity before production starts and the first injection step begins.

The change-over block 14 for changing the resin path of the stationary die 1 is also positioned at the top of the recess 1h in the platen 10 (the "up position" below), and the resin supply opening 13h is therefore open to the first resin path 21 as shown in FIG. 8.

Therefore, when molten resin is injected from the injection head 5 of the molding machine in the above die clamping (first die clamping) position (first injection), the molten resin will be supplied through the resin supply opening 13h of the sprue bushing 13 to the source path 21S of the first resin path 21, sequentially therefrom to each of the branch paths 21B to 21D and end channels 21b to 21d, and thus into each of the cavities. See the dot-dash line in FIG. 7 and the shaded area in FIG. 8.

A typical resin material used in this preferred embodiment of the invention is a glass fiber reinforced nylon resin.

After this first injection step, the following moldings are obtained in the cavities formed by the molding portions of the stationary die 1 and movable die 2 as described above. That is:

in the cavity of female molding portion 40A and female molding portion 20B is obtained finished product W;

in the cavity of male molding portion 40B and female molding portion 20C is obtained upper half Wu;

in the cavity of female molding portion 40C and male molding portion 20D is obtained lower half WL.

Next, as shown in FIG. 4, the movable die 2 is retracted parallel to the stationary die 1, thereby opening the mold, and the finished product W formed by female molding portion 40A and male molding portion 20B is removed (first removal process). While not shown in the figures, it should be noted that an ejector mechanism is typically disposed on the movable die 2 side to remove the finished product W from the female molding portion 40A or 40C when the movable die 2 is opened.

After opening the movable die 2, the platen 10 of the stationary die 1 is held parallel to and separated from the middle support platen 12 to remove any excess resin from the first injection process in the corresponding resin path. Though not specifically shown in the figures, note that separating and mating (opening and closing) the platen 10 to the middle support platen 12 is accomplished by means of a mold ejection cylinder disposed to the middle support platen 12.

The platen drive cylinder 34 is then operated to slide the platen 30 of movable die 2 up a specific distance as shown in FIG. 9 (first sliding process). Then, as shown in FIG. 5, the movable die 2 is closed and clamped to the stationary die 1 (second clamping process).

As a result of this first sliding process and second clamping process, the following cavities are formed between the stationary die 1 and movable die 2. Specifically:

between movable die female molding portion 40A and stationary die male molding portion 20A: a molding cavity for lower half WL;

between movable die male molding portion 40B and stationary die female molding portion 20B: a molding cavity for upper half Wu;

between movable die female molding portion 40C and stationary die female molding portion 20C: a cavity for combining upper and lower half bodies Wu and WL.

It should be noted that the upper and lower half bodies Wu and WL combined in the cavity formed by the female molding portion 40C of the movable die 2 and the female molding portion 20C of the stationary die 1 were molded in the first injection process of the present cycle described above with reference to FIG. 3.

The block drive cylinder 15 is then operated to switch the change-over block 14 to the down position in the platen recess 10h, thereby changing the resin path of the stationary die 1 so that the resin supply opening 13h and second resin path 22 are connected as shown in FIG. 10.

When molten resin is then injected from the injection head 5 of the molding machine in the above second die clamping position (second injection), the molten resin flows through the resin supply opening 13h of the sprue bushing 13 to the source path 22S of the second resin path 22, sequentially therefrom to each of the branch paths 22A to 22C and end channels 22a to 22c, and thus into each of the cavities. See the dot-dash line in FIG. 9 and the shaded area in FIG. 10.

After this second injection step, the following molded parts and/or product are obtained in the cavities formed by the molding portions of the stationary die 1 and movable die 2 as described above. That is:

in the cavity of female molding portion 40A and male molding portion 20A, lower half WL;

in the cavity of male molding portion 40B and female molding portion 20B, upper half Wu;

in the cavity of female molding portion 40C and female molding portion 20C, finished product W.

Next, as in the first removal process shown in FIG. 4, the movable die 2 is opened parallel to the stationary die 1, and the stationary die platen 10 is separated from the middle support platen 12, to remove the finished product w produced by bonding upper and lower half bodies Wu and WL in this cycle from the mold (second removal process) and remove any excess resin from the resin path.

The platen drive cylinder 34 is then operated to slide the movable die platen 30 a specific distance in the direction opposite in which it was slid in the first sliding process, that is, downward (second sliding process). The movable die 2 is then again closed and clamped to the stationary die 1 in preparation for the next cycle.

It will thus be obvious that by repeating the steps shown in FIG. 3 to FIG. 5, one synthetic resin hollow member (three-way joint W) obtained by bonding upper and lower half bodies Wu and WL can be obtained with each sliding operation of the movable die platen 30.

As described above, it is possible by means of this preferred embodiment of the present invention to produce a hollow member (three-way joint W) of two bonded upper and lower half bodies Wu and WL with each sliding operation of the movable die platen 30 and stationary die platen 10.

Furthermore, similarly to the so-called double die slide process described above, the width of the molds in a molding machine according to the present invention can be minimized because the series of molding portions 20A to 20D and molding portions 40A to 40C of the first and second half bodies are arranged in the lengthwise direction of the dies as shown in the figures.

In addition, the method of the present invention requires only seven molding portions whereas the conventional double die slide method requires eight. Because the method of the present invention thus requires one less molding portion compared with the conventional double die slide process, molds and dies therefor can be manufactured more easily and at lower cost.

Embodiment 2

A second preferred embodiment of the present invention is described next below. A synthetic resin hollow member manufacturing method and apparatus according to this preferred embodiment relate to a hollow member having an intermediate element such as a filter included inside the hollow member during the manufacturing process.

Figure 11:
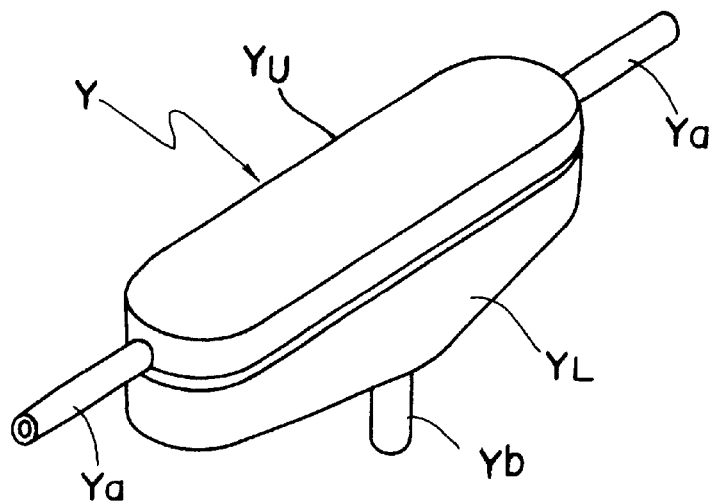
FIG. 11 is a perspective view of an oil strainer according to a second embodiment of the present invention.
Figure 12:
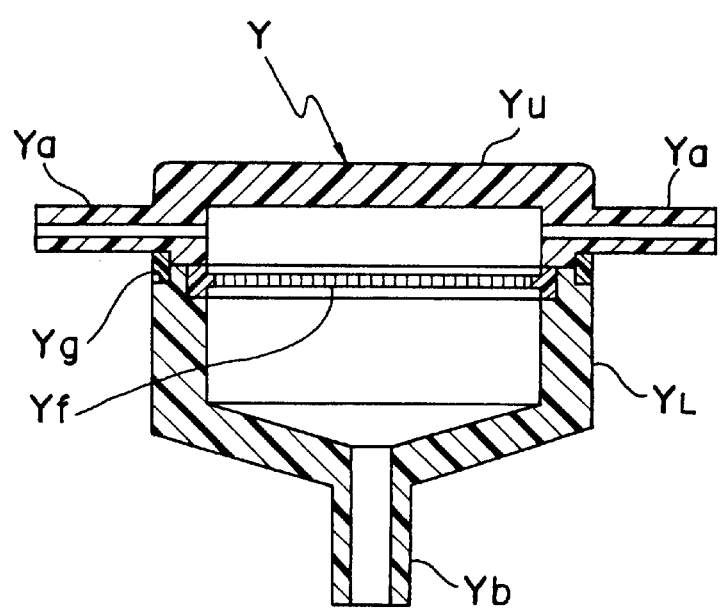
FIG. 12 is a section view of the oil strainer shown in FIG. 11.

FIG. 11 and FIG. 12 show an oil strainer Y (referred to alternatively as the "work" or "molding" below) manufactured as the synthetic resin hollow member in this preferred embodiment. It should be noted that this oil strainer Y has the same external appearance as the three-way joint W described in the first embodiment above, and differs therefrom only in the inclusion of a filter Yf inside the hollow member.

As shown in these figures, this oil strainer Y is a hollow member. formed by mating an upper half $Y_U$ having two opposing branches Ya with a lower half $Y_L$ having one branch Yb such that a cavity is formed inside.

As will also be known from FIG. 12, a U-shaped channel Yg is preferably formed to the outside circumference of the abutting portions of the upper and lower half bodies $Y_U$ and $Y_L$, preferably by wall sections of the upper and lower half bodies $Y_U$ and $Y_L$. During molding, the open side of this channel is closed by the die wall, thereby forming a resin channel that is closed on all sides.

After a synthetic resin-made filter Yf is placed between the upper and lower half bodies $Y_U$ and $Y_L$ in the mold and the two half bodies $Y_U$ and $Y_L$ are combined, resin (forming resin) for bonding the upper and lower half bodies $Y_U$ and $Y_L$ can be filled to this resin channel to obtain the finished product Y.

A method according to the present invention for manufacturing this oil strainer Y, and the construction of a molding machine for a die slide process used in this preferred method, are described next below.

A molding machine used in this preferred embodiment is substantially identical to that used in the first embodiment, differing only in that a filter molding portion for molding a filter Yf is further disposed at one end of the stationary die 1 and movable die 2, that is, at the top or bottom as seen in the figures. Like parts in this embodiment and the first embodiment are therefore identified by the same reference numerals, and further description thereof is thus omitted below.

Figure 13:
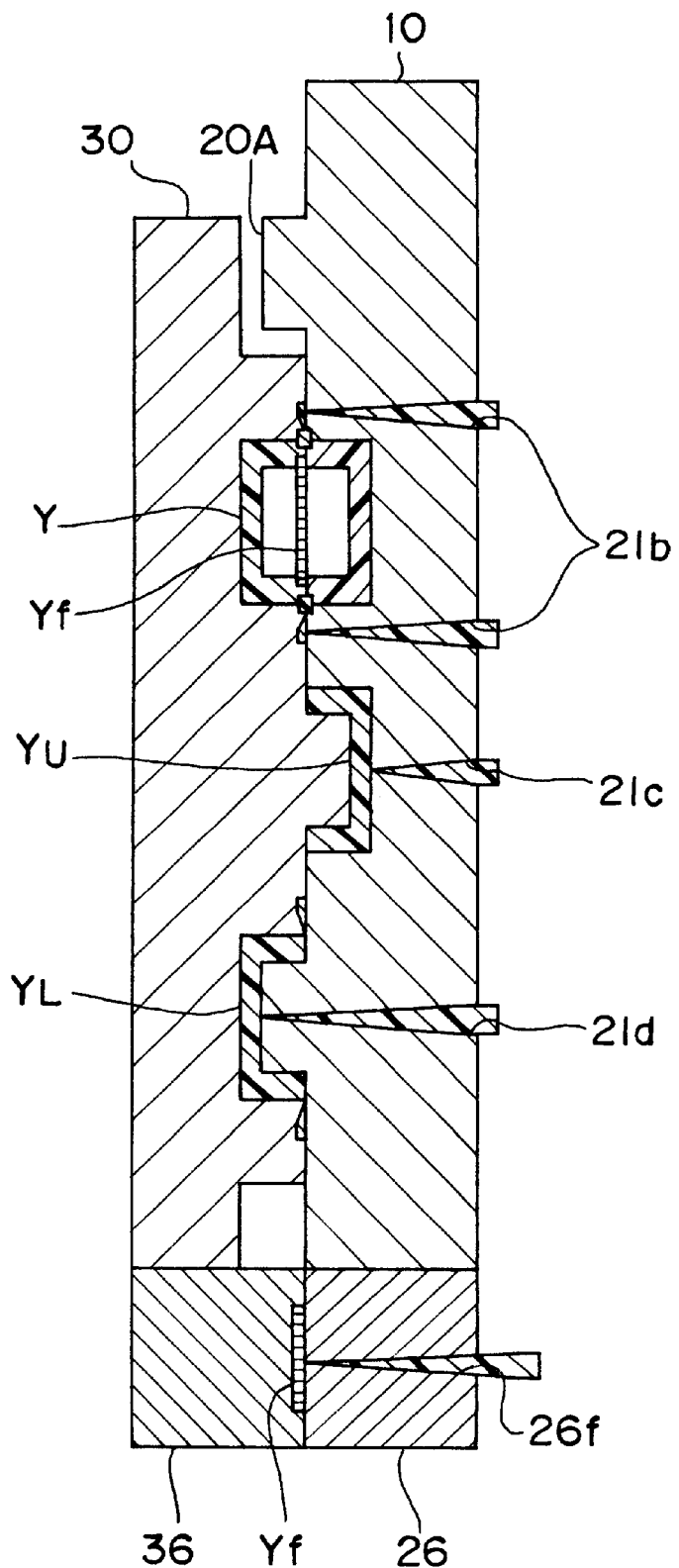
FIG. 13 is a section view of a molding machine at a first die clamping stage and a first injection molding stage in a molding sequence for the oil strainer shown in FIG. 11.
Figure 14:
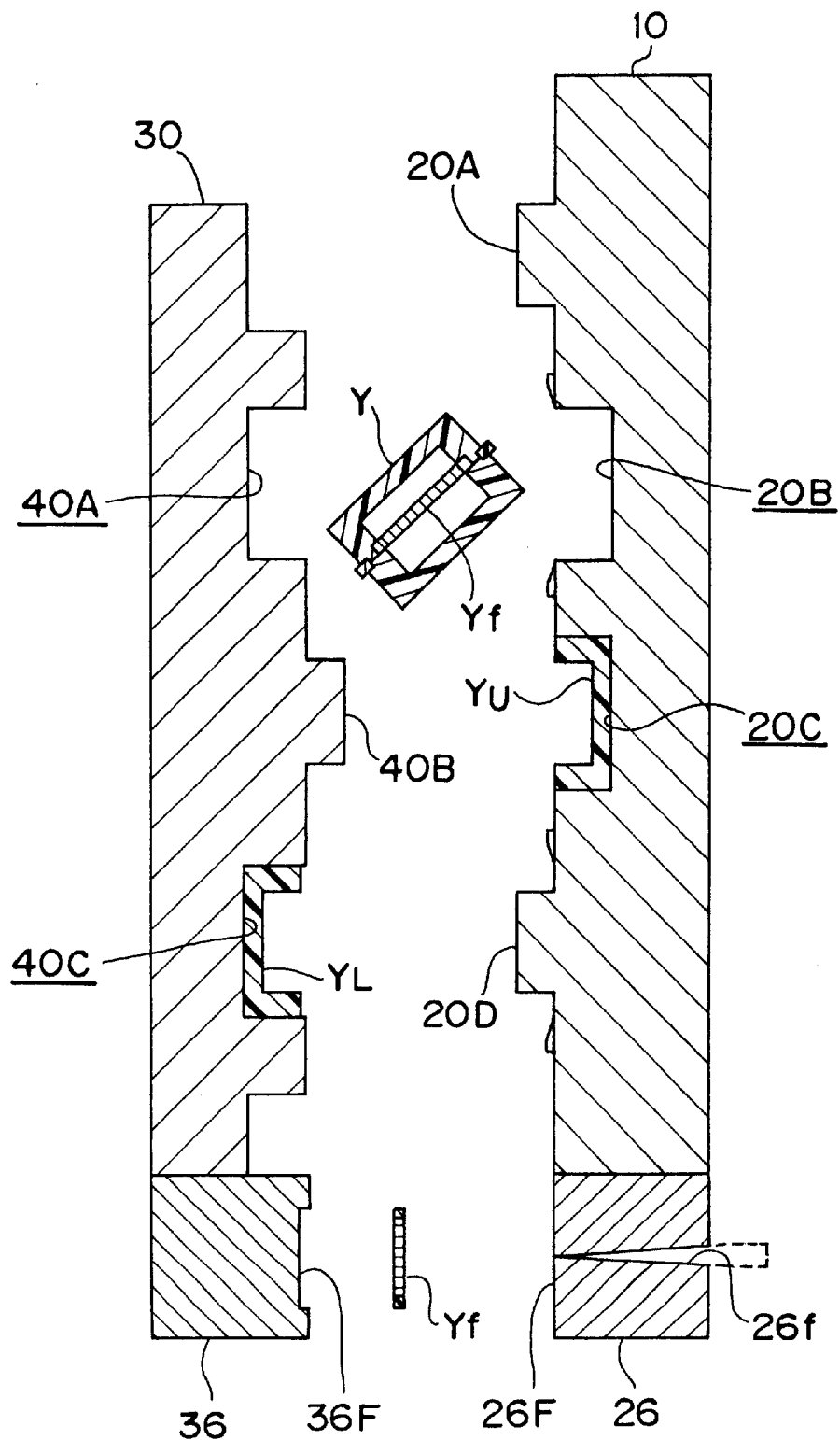
FIG. 14 is a section view of a molding machine at a first ejection stage in a molding sequence for the oil strainer shown in FIG. 11.
Figure 15:
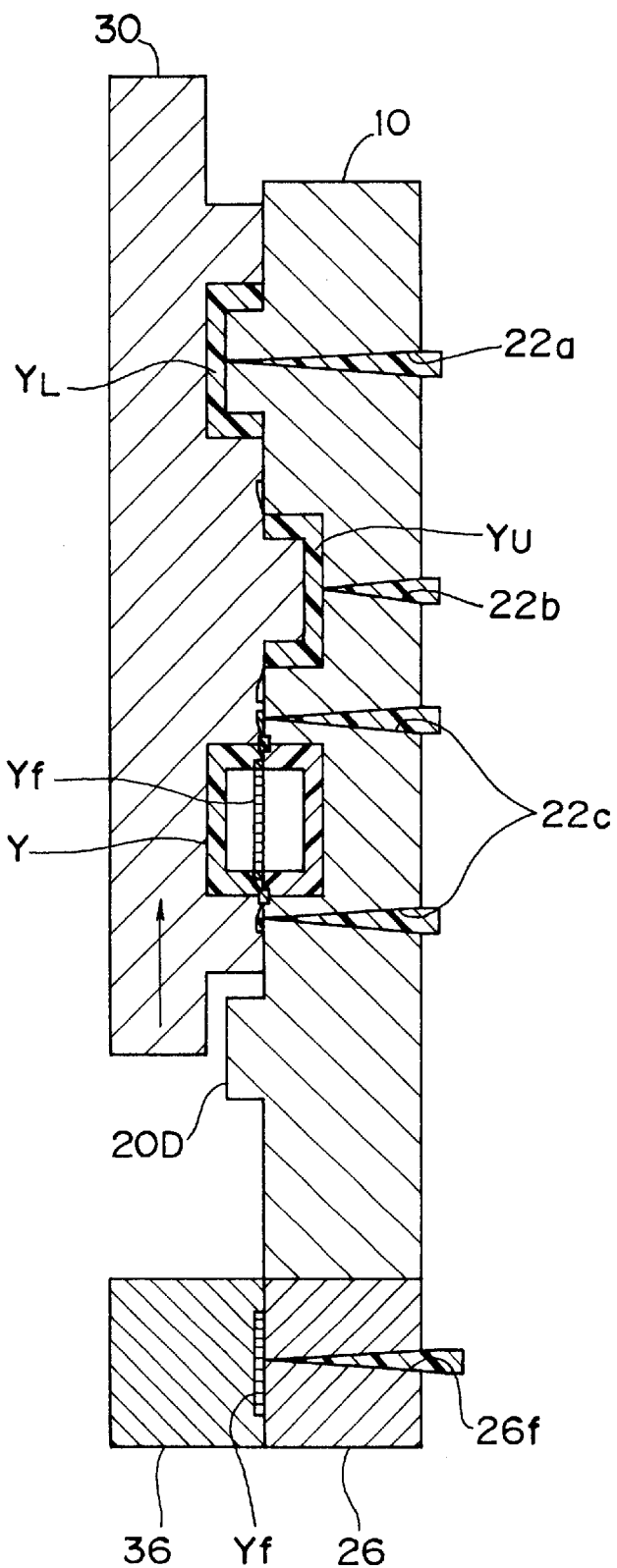
FIG. 15 is a section view of a molding machine at a second die clamping stage and a second injection molding stage in a molding sequence for the oil strainer shown in FIG. 11.
Figure 16:
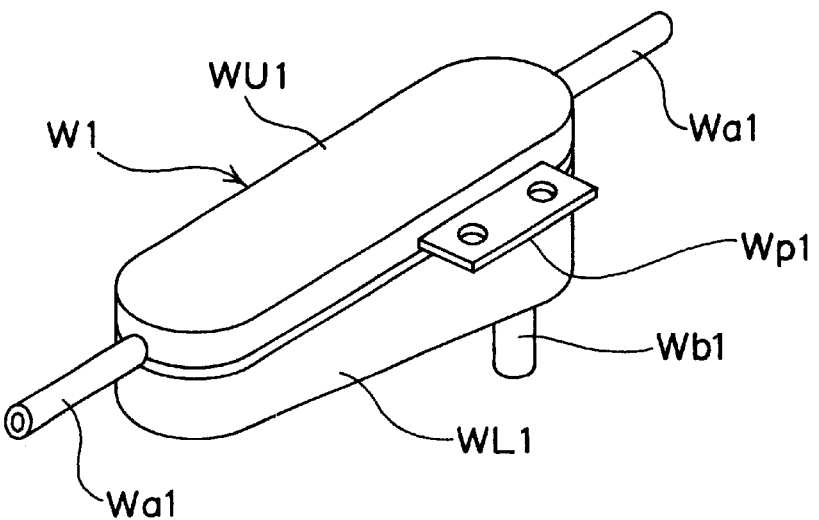
FIG. 16 is a perspective view of a first three-way joint according to a third preferred embodiment of the present invention.

FIG. 13 to FIG. 15 are section views of a typical molding machine used to describe the molding sequence of an oil strainer Y. It should be noted that the base plate 11 and middle support platen 12 of the stationary die 1, and the base plate 31 and slide rails 32 of the movable die 2, are omitted from these figures.

As seen in these figures, a filter die section 26 having a filter molding portion 26F for molding a filter Yf is provided at the bottom end of the stationary die platen 10. This filter die section 26 is fixed to the middle support platen 12 of the stationary die 1, and is thus immobile with respect to the platen 10.

In addition, a filter die section 36 with a filter molding portion 36F corresponding to the filter molding portion 26F of the stationary die 1 is disposed at the bottom end of the movable die platen 30 at a position corresponding to the filter die section 26 of the stationary die 1. This filter die section 36 is fixed to the base plate 31 of the movable die 2. The filter die section 36 therefore opens from and closes to the filter die section 26 of the stationary die 1 when the movable die 2 is opened from and closed to the stationary die 1, but the filter die section 36 of the movable die 2 does not slide when the platen 30 slides up and down. In other words, the pair of filter die sections 26 and 36 can open and close to each other, but do not slide.

An end channel 26f passes through the filter die section 26 of the stationary die 1 and is open to the filter molding portion 26F. Molten resin can therefore be injected through the end channel 26f into the filter molding portion 26F. More specifically, the end channel 26f is constantly open to the resin supply opening 13h of the sprue bushing 13 by way of the resin path in the middle support platen 12, though this is not shown in FIG. 13 to FIG. 15. As a result, injection resin is supplied to the end channel 26f every time molten resin is injected from the injection head 5 of the molding machine.

An oil strainer Y as described above is manufactured (molded) using the above-noted molding machine by a repeating sequence of die clamping, injection, removal, and die slide steps as described in the first embodiment. The method of this second embodiment differs, however, in that (1) a filter Yf is also molded, and (2) when the mold is opened in the removal step, the molded filter Yf is inserted for assembly between the upper and lower half bodies $Y_U$ and $Y_L$.

This process is described more specifically below.

When the movable die 2 is closed and clamped to the stationary die 1 (first die clamping), a molding cavity is formed by the molding parts 26F and 36F of the filter die sections 26 and 36 as shown in FIG. 13 (which corresponds to FIG. 3 in the first embodiment). Molten resin is then injected in the first injection molding step, and a filter Yf is thus formed in this molding cavity.

Next, as shown in FIG. 14 (corresponding to FIG. 4 of embodiment 1), the movable die 2 is opened from the stationary die 1 and the finished product Y is removed. At the same time the filter Yf molded in the first injection molding step (FIG. 13) is also removed (first removal), and is inserted to the lower half $Y_L$. While the specific steps for filter Yf removal and insertion to the lower half $Y_L$ are not shown in the figures, this is typically accomplished by means of a removal machine (robot) that is used in conjunction with the molding machine for molding removal and has a chuck. More specifically, this removal robot typically grasps the molding (filter Yf) with the chuck to remove the filter Yf from the mold and move and insert the filter Yf into the lower half $Y_L$.

Then, as shown in FIG. 15 (corresponding to FIG. 5 of embodiment 1), the platen 30 of movable die 2 is slid up a specific distance, the movable die 2 is closed and clamped to the stationary die 1 (second clamping process), and molten resin is injected (second injection). As a result, the upper and lower half bodies $Y_U$ and $Y_L$ are bonded at the interface therebetween (channel Yg) by the molten resin, and an oil strainer Y having an integral synthetic resin filter Yf assembled between the upper and lower half bodies $Y_U$ and $Y_L$ is obtained. Note that the filter Yf to be inserted to the next oil strainer Y is also molded at the same time.

A second removal process identical to the first removal process is then performed to remove the finished product Y and insert the filter Yf to the lower half $Y_L$ of the next oil strainer Y, and a second slide process in which the platen 30 is slid in the direction opposite that of the first slide process is performed before closing and clamping the mold for the next molding cycle.

By thus repeating the steps shown in FIG. 13 to FIG. 15, one synthetic resin hollow member (oil strainer Y) having an intermediate element (filter Yf) assembled between the upper and lower half bodies $Y_U$ and $Y_L$ of the hollow member is obtained with each sliding operation of the movable die platen 30.

As described above, it is possible by means of this preferred embodiment of the present invention to produce one hollow member (oil strainer Y) having an intermediate element (filter Yf) assembled between the two bonded upper and lower half bodies $Y_U$ and $Y_L$ with each sliding operation of the movable die platen 30 and stationary die platen 10.

Furthermore, the width of the molds in a molding machine according to the present embodiment can also be minimized, similarly to the so-called double die slide injection (DSI) process described above, because the molding portions 20A to 20D and molding portions 40A to 40C of the first and second mold half bodies, and also the filter die sections 26 and 36 and molding portions 26F and 36F are arranged in the lengthwise direction of the dies as shown in the figures.

Separate processes and procedures for manufacturing and managing an inventory of intermediate elements (filters Yf) are also not necessary because the process for manufacturing the filter Yf is performed as part of the process for molding and forming the upper and lower half bodies $Y_U$ and $Y_L$ into which the filter Yf is assembled. Assembling the intermediate element (filter Yf) into the hollow member is therefore easier and more precise compared with conventional methods because the molding conditions and temperature of the intermediate element Yf and upper and lower half bodies $Y_U$ and $Y_L$ are substantially identical during assembly.

Embodiment 3

A third preferred embodiment of the present invention is described next below. This third embodiment relates to a manufacturing method and apparatus for obtaining two types of synthetic resin hollow bodies from a single mold.

FIG. 16 to FIG. 19 show a first and second three-way joint W1 and W2, respectively, according to this preferred embodiment. It should be noted that these threeway joints W1 and W2 or hollow bodies may also be referred to as the "work" or "molding" below. As will be known from the figures, these three-way joints W1 and W2 are hollow bodies formed by mating an upper half $W_U1$ and $W_U2$ having two opposing branches Wa1 and Wa2 with a lower half $W_L1$ and $W_L2$ having one branch Wb1 and Wb2 such that a cavity is formed inside.

The one branch Wb1 and Wb2 of each lower half $W_L1$ and $W_L2$ is disposed offset to one end of the three-way joint relative to a line between the two branches Wa1 and Wa2 of the upper half $W_U1$ and $W_U2$. In addition, the bottom of each lower half $W_L1$ and $W_L2$ is sloped such that the part to which the branch Wb1 and Wb2 is disposed is lowest.

The first three-way joint W1 (see FIG. 16 and FIG. 17) has a mounting plate Wp1 disposed at the front right side where the end of the first three-way joint W1 to which the branch Wb1 of the lower half $W_L1$ is disposed is referred to as the front. The mounting plate Wp1 is integrally molded with and projecting from the side of the upper half $W_U1$, and is used for mounting the three-way joint W1 to some other member. This first three-way joint W1 is thus referred to below as a "right hand" part.

The second three-way joint W2 (see FIG. 18 and FIG. 19) has a mounting plate Wp2 disposed at the front left side where the end of the three-way joint W2 to which the branch Wb2 of the lower half $W_L2$ is disposed is referred to as the front. The mounting plate Wp2 is likewise integrally molded with and projecting from the side of the upper half $W_U2$, and is used for mounting the three-way joint W2 to some other member. This second threeway joint W2 is thus referred to below as a "left hand" part.

As will be described in detail below, these three-way joints W1 and W2 are produced using a so-called die slide injection (DSI) molding, or die slide, process whereby both upper and lower half bodies $W_U1$, $W_U2$ and $W_L1$, $W_L2$ are formed, mated, and bonded inside the dies in a single molding machine to obtain a hollow member.

Figure 17:
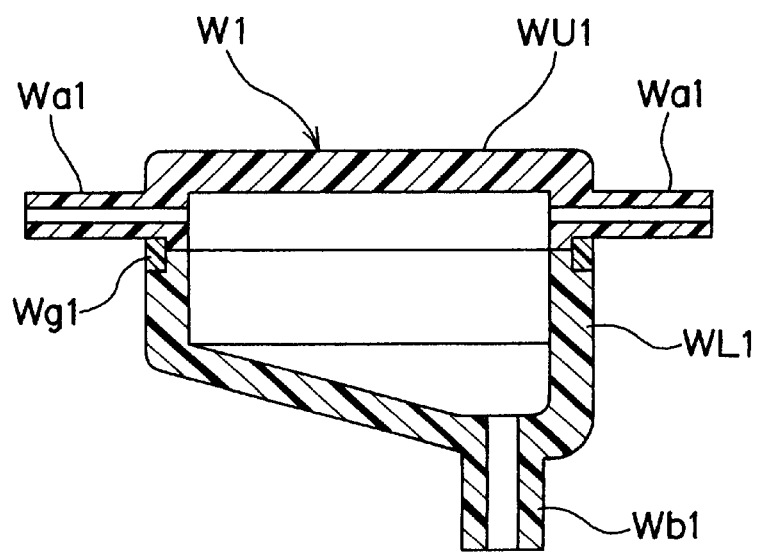
FIG. 17 is a section view of the first three-way joint shown in FIG. 16.
Figure 18:
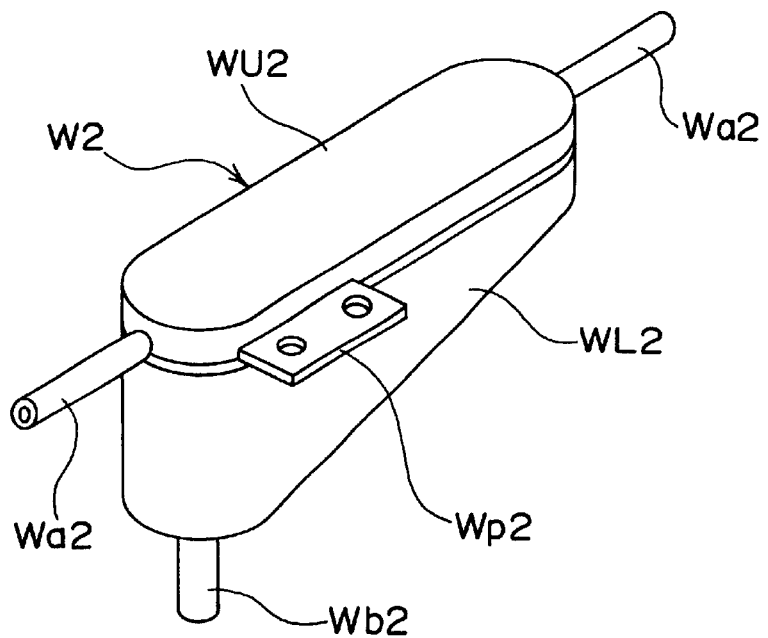
FIG. 18 is a perspective view of a second three-way joint according to a third preferred embodiment of the present invention.
Figure 19:
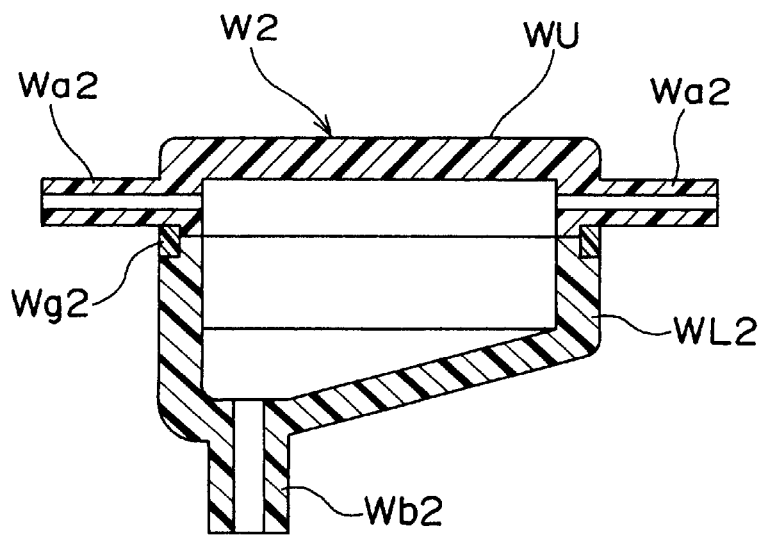
FIG. 19 is a section view of the second three-way joint shown in FIG. 18.

As will be known from FIG. 17 and FIG. 19, a U-shaped channel Wg1 and Wg2 is preferably formed to the outside circumference of the abutting portions of the upper and lower half bodies $W_U1$, $W_U2$ and $W_L1$, $W_L2$, preferably by wall sections of the upper and lower half bodies. During molding, the open side of this channel is closed by the die wall, thereby forming a resin channel that is closed on all sides. As a result, resin (secondary resin) for bonding the upper and lower half bodies $W_U1$, $W_U2$ and $W_L1$, $W_L2$ can be filled to this resin channel when the upper and lower half bodies $W_U1$, $W_U2$ and $W_L1$, $W_L2$ are mated in the dies.

A method according to the present invention for manufacturing (molding) these first and second three-way joints W1 and W2, and the construction of a molding machine for a die slide process used in this preferred method, are described next below with reference to FIG. 20.

Similarly to the first embodiment, four molding portions 70A to 70D are disposed in the registration surface of the platen 60 of the stationary die 51, and three molding portions 90A to 90C are disposed in the registration surface of the platen 80 of the movable die 52. Note that the arrangement of these molding portions is identical to that of the first embodiment, and differ only in that they yield two types of moldings W1 and W2 from a single molding machine. Like parts in this embodiment and the first embodiment are therefore identified by the same reference numerals, and further description thereof is thus omitted below.

Note that the four molding portions 70A to 70D are disposed in the registration surface of the platen 60 of the stationary die 51 at a specific equal interval along the sliding direction of the molds. Furthermore, of these four molding portions, the top and bottom molding portions 70A and 70D are male molding portions with the exposed front sloping in one direction (the right side in FIG. 20). The other two molding portions 70B and 70C are recessed female dies, each including a part corresponding to the mounting plates Wp1 and Wp2.

As in the first embodiment, two male molding portions 70A and 70D and two female molding portions 70B and 70C are thus disposed in male-female-female-male sequence at specific intervals lengthwise (that is, vertically as shown in the accompanying figures) to the registration surface of the stationary die platen 60.

Differing from the first embodiment, however, the top two 70A and 70B of these four molding portions 70A to 70D are for the right hand first three-way joint W1, and the bottom two 70C and 70D are for the left hand second three-way joint W2.

Note that the end channels 71b to 71d and 72a to 72c of the resin paths disposed in the platen 60 of the stationary die 51 are used for the same function as the corresponding end channels 21b to 21d and 22a to 22c in the first embodiment. In other words, resin is supplied to the end channels 71b to 71d and 72a to 72c of this embodiment in the same manner as in the first embodiment.

Three molding portions 90A to 90C are similarly disposed in the registration surface of the movable die platen 30 in series at a specific equal interval along the sliding direction of the molds. As with the molding portions 20A to 20D in the stationary die 1, these molding portions 40A to 40C are arranged horizontally on the registration surface of the platen 30.

As noted above, three molding portions 90A to 90C are disposed in the registration surface of the platen 80 of the movable die 52 in series at a specific equal interval along the sliding direction (vertical direction) of the molds. Furthermore, of these three molding portions, the top and bottom molding portions 90A and 90C are female die parts where the bottom of the recess is inclined according to the slope of the matching top and bottom male molding portions 70A and 70D of the stationary die 51, although this incline is not specifically shown in the figures. The remaining middle molding portion 90B is a male molding portion having the same form as the corresponding male molding portion in the first embodiment of the invention.

In other words, as in the first embodiment, two female molding portions 90A and 90C and one male molding portion 90B are disposed in female-male-female sequence at specific intervals lengthwise (that is, vertically as shown in the accompanying figures) to the registration surface of the movable die platen 80.

The interval between each of the molding portions 90A to 90C on the movable die 52 is the same as the interval between each of the molding portions 70A to 70D in the stationary die 51. In addition, the longitudinal sliding distance of the movable die platen 80 on the base plate 31 is equal to this interval between the molding portions 90A to 90C. Note that this is the same as in the first embodiment.

A molding process for manufacturing two different three-way joints W1 and W2 using the above-described molding machine is described next below.

Figure 20:
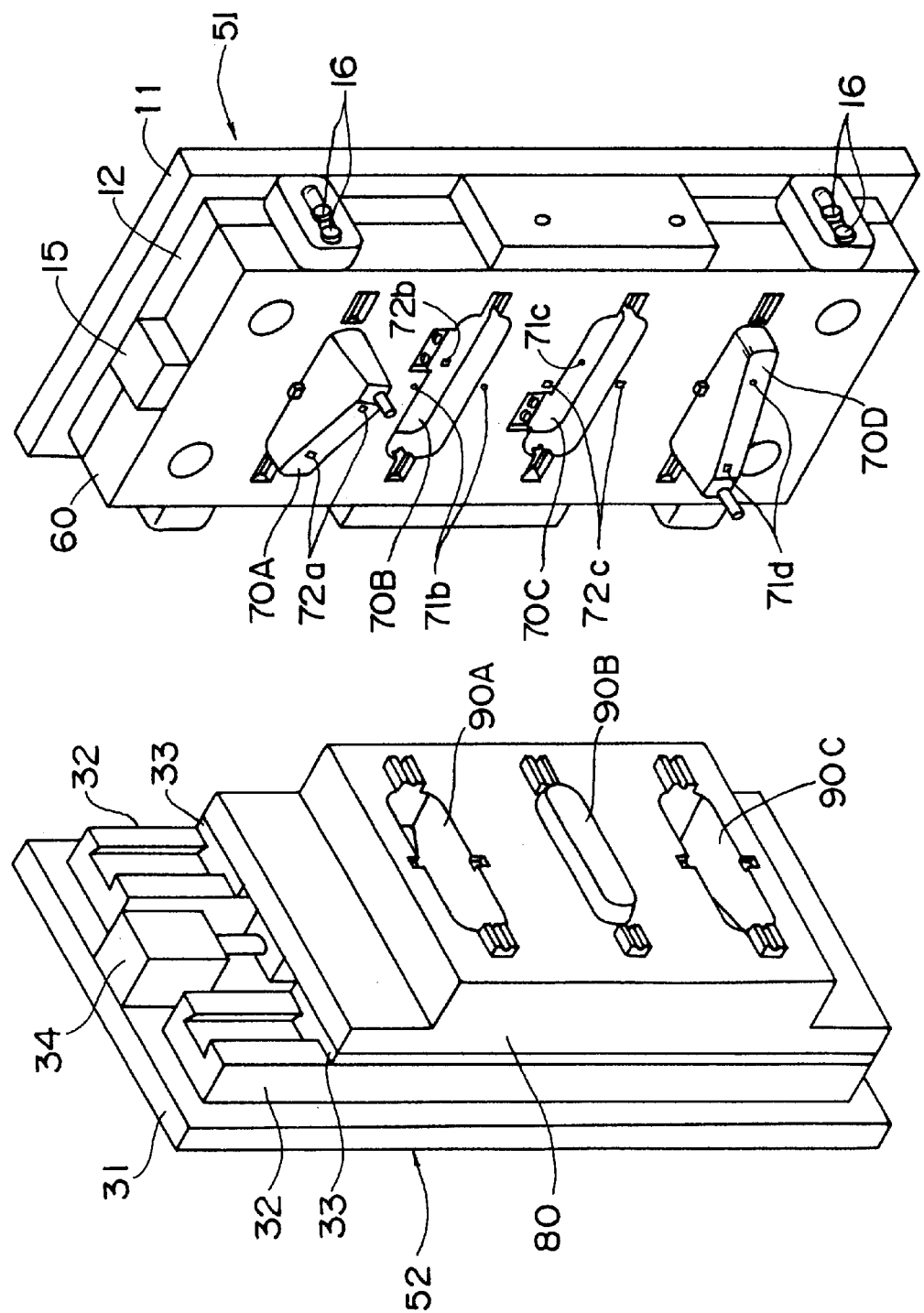
FIG. 20 is a perspective view of the stationary die and movable die according to a third embodiment of the present invention.

At the start of this process as seen in FIG. 20, the platen 80 of movable die 52 is positioned at the bottom of the base plate 31 (the "down position" below), and the movable die 52 is closed and clamped to the stationary die 51 (first die clamping). The molding portions of the stationary die 51 and movable die 52 are thus combined forming resulting molding cavities as described below. Specifically:

between movable die female molding portion 90A and stationary die female molding portion 70B: a cavity for combining upper and lower half bodies $W_U1$ and $W_L1$ of the first three-way joint W1;

between movable die male molding portion 90B and stationary die female molding portion 70C: a molding cavity for upper half $W_U2$ of second three-way joint W2;

between movable die female molding portion 90C and stationary die male molding portion 70D: a molding cavity for lower half $W_L2$ of second three-way joint W2.

The lower half $W_L1$ of the first three-way joint W1 held in the female molding portion 90A of the movable die 52, and the upper half $W_U1$ of the first three-way joint W1 held in female molding portion 70B of the stationary die 51, are thus combined in the cavity formed between the female molding portion 90A of the movable die 52 and the female molding portion 70B of the stationary die 51. Finished product W1 is then obtained by injecting and filling molten resin to the channel Wg1 around the interface between these molding half bodies. It should be noted that both half bodies $W_U1$ and $W_L1$ combined in this cavity were molded in the previous molding cycle.

It should be further noted that for the first injection process at the start of production there are no moldings in this cavity. A dummy having the same shape as the mated upper and lower half bodies $W_U1$ and $W_L1$ is therefore inserted to the cavity before production starts and the first injection step begins. Note that this is the same as in the first embodiment above.

When molten resin is then injected (first injection) from the injection head 5 in this first die clamping position, the following moldings are obtained in the cavities formed by the molding portions of the stationary die 51 and movable die 52 as described above. That is:

in the cavity of female molding portion 90A and female molding portion 70B is obtained finished product (first three-way joint) W1;

in the cavity of male molding portion 90B and female molding portion 70C is obtained upper half $W_U2$ of a second three-way joint W2;

in the cavity of female molding portion 90C and male molding portion 70D is obtained lower half $W_L2$ of a second three-way joint W2.

The movable die 52 is then retracted parallel to the stationary die 51, thereby opening the mold, and the finished product, that is, right hand first three-way joint W1, formed by female molding portion 90A and female molding portion 70B is removed (first removal process). While not shown in the figures, it should be noted that an ejector mechanism is typically disposed on the movable die 52 side to remove the finished product from the female molding portion 90A or 90C when the movable die 52 is opened.

After opening the movable die 52, the platen 60 of the stationary die 51 is held parallel to and separated from the middle support platen 12 to remove any excess resin from the first injection process in the corresponding resin path. Though not specifically shown in the figures, note that separating and mating (opening and closing) the platen 60 to the middle support platen 12 is accomplished in the same manner as described in the first embodiment.

The platen drive cylinder 34 is then operated to slide the platen 80 of movable die 52 up a specific distance (first sliding process). The movable die 52 is then closed and clamped to the stationary die 51 (second clamping process).

As a result of this first sliding process and second clamping process, the following cavities are formed between the stationary die 51 and movable die 52. Specifically:

between movable die female molding portion 90A and stationary die male molding portion 70A: a molding cavity for lower half $W_L1$ of a first three-way joint W1;

between movable die male molding portion 90B and stationary die female molding portion 70B: a molding cavity for upper half $W_U1$ of a first three-way joint W1;

between movable die female molding portion 90C and stationary die female molding portion 70C: a cavity for combining upper and lower half bodies $W_U2$ and $W_L2$ of second three-way joint W2.

It will be obvious to one with ordinary skill in the related art that the male molding portion 90B of movable die 52 is compatible with the female molding portions of the stationary die 51 at both the first clamping position, that is, female molding portion 70C, and the second clamping position, that is, female molding portion 70B.

It should be noted that the upper and lower half bodies $W_U1$ and $W_L2$ of the second three-way joint W2 are combined in the cavity formed by the female molding portion 90C of movable die 52 and the female molding portion 70C of the stationary die 51, and are both molded in the first injection step of the present molding cycle.

As in the first embodiment, the block drive cylinder 15 is then operated to switch the change-over block 14 to the down position, thereby changing the resin path of the stationary die 51.

When molten resin is then injected from the injection head 5 of the molding machine in the above second die clamping position (second injection), the following moldings are obtained in the cavities formed by the molding portions of the stationary die 51 and movable die 52 as described above. That is:

in the cavity of female molding portion 90A and male molding portion 70A: lower half $W_L1$ of a first three-way joint W1;

in the cavity of male molding portion 90B and female molding portion 70B: upper half $W_U1$ of a first three-way joint W1;

in the cavity of female molding portion 90C and female molding portion 70C: a finished second three-way joint W2.

Next, as in the first removal process, the movable die 52 is opened parallel to the stationary die 51, and the stationary die platen 60 is separated from the middle support platen 12, to remove the finished product, that is, left hand second three-way joint W2, produced by bonding upper and lower half bodies $W_U2$ and $W_L2$ for the present cycle from the die (second removal process) and remove any excess resin in the second injection process from the resin path.

The platen drive cylinder 34 is then operated to slide the movable die platen 80 a specific distance in the direction opposite in which it was slid in the first sliding process, that is, downward (second sliding process). The movable die 52 is then again closed and clamped to the stationary die 51 in preparation for the next cycle.

It will thus be obvious that by repeating the above-described steps, one right hand first three-way joint W1 obtained by bonding upper and lower half bodies $W_U1$ and $W_L1$, and one left hand second three-way joint W2 obtained by bonding upper and lower half bodies $W_U2$ and $W_L2$, can be obtained with every two sliding operations of the movable die platen 80.

As described above, it is possible by means of this preferred embodiment of the present invention to produce a right hand first three-way joint W1 and a left hand second three-way joint W2 with every two sliding operations of the stationary die 51 and movable die 52. More specifically, two different types of hollow molded members can be produced using a single molding machine, thereby holding down die and mold costs and improving process management. Furthermore, by using a die slide injection (DSI) process, two different types of hollow members can be efficiently manufactured.

The effects of these benefits are particularly dramatic in the production of small lots. It will also be obvious that when molding matching products, such as left-and right-handed moldings as described in this preferred embodiment or top and bottom moldings, one pair of matching moldings can be obtained with every two injection steps. It is therefore easier to limit the variations between production lots, such as slight differences in color (when finished products are colored moldings), compared with manufacturing such paired moldings in separate processes.

Furthermore, as in the first embodiment and similarly to the so-called double die slide injection (DSI) process described above, the width of the dies in a molding machine according to the present invention can be minimized because the molding portions are arranged in the lengthwise direction of the dies as shown in the figures.

In addition, the method of the present invention requires only seven molding portions whereas the conventional double DSI method requires eight. Because the method of the present invention thus requires one less molding portion compared with the conventional double DSI process, molding dies therefor can be manufactured more easily and at lower cost.

It will also be obvious to one with ordinary skill in the related art that while this third embodiment of the present invention has been described using a right hand first three-way joint W1 and left hand second three-way joint W2 as exemplary of the manufactured hollow bodies, the invention shall not be so limited. More specifically, the invention shall not be limited to moldings that differ symmetrically right to left or top to bottom.

Even more specifically, the present invention can be applied to a die slide process for manufacturing any two different hollow molded members insofar as the male molding portion of the movable die can be used as the male part for a female molding portion of the stationary die at a first die clamping position, and for the female molding portion of the stationary die at a second clamping position. In other words, the present invention can be used in a DSI process to efficiently manufacture two different types of hollow molded members when the movable die has three molding portions in a female-male-female arrangement, the stationary die has four molding portions in a male-female-female-male arrangement, and the male molding portion in the middle of the three-part movable die can be used with both of the female molding portions in the middle of the four-part stationary die.

Furthermore, the present invention has been described in the above three preferred embodiments with reference to a three-way joint or oil strainer, but the invention shall obviously not be so limited. That. is, the present invention can be applied effectively in the manufacture of various types of synthetic resin-made hollow products that are formed by bonding a pair of resin-made half bodies with a simultaneously molded intermediate element, such as a filter, that is assembled as required between the hollow member half bodies during the molding and forming sequence.

Benefits of the Invention

As described above, a hollow member formed by bonding first and second hollow member half bodies can be obtained by a first embodiment of the present invention each time a first molding die and a second molding die are slid relative to each other in a so-called die slide injection (DSI) process.

According to a further version of the present invention, a hollow member having an intermediate element such as a filter incorporated between the first and second half bodies can be obtained with each sliding operation of the first and second hollow member dies. In this case, separate processes and procedures for manufacturing and managing an inventory of intermediate elements are also not necessary because the process for manufacturing the intermediate elements is performed as part of the process for molding and forming the hollow member half bodies into which the intermediate element is assembled. Assembling an intermediate element into a hollow member is therefore easier and more precise compared with conventional methods because the molding conditions and temperature of the intermediate element and hollow member half bodies are substantially identical during assembly.

According to a yet further embodiment of the present invention, a first hollow member comprising bonded first and second half bodies, and a second hollow member comprising third and fourth half bodies, can be sequentially obtained for every two sliding operations of the first and second molds. That is, two different types of hollow molded members (a first hollow member and a second hollow member) can be manufactured using a single molding machine with first and second molding dies. Mold and die cost can therefore be held down, and process control can be simplified. Using a DSI process, the present invention can therefore efficiently manufacture two different hollow bodies.

As also described above, and similarly to a conventional double DSI process, the width of the molding dies in a molding machine according to the present invention can be minimized because the molding portions are arranged in the lengthwise direction of the molding dies as shown in the figures.

The method of the present invention also requires only seven molding portions whereas the conventional double DSI method requires eight. The method of the present invention thus requires one less molding portion compared with the conventional double DSI process, and molds and dies for the manufacturing method and apparatus according to the present invention can therefore be manufactured more easily and at lower cost.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A manufacturing method for manufacturing a synthetic resin hollow member by bringing a pair of synthetic resin-made half bodies into abutment with each other and joining the half bodies together at their abutting portions, wherein said manufacturing method uses a die slide injection molding apparatus comprising:

a first die having formed lengthwise thereinto a series of molding portions in male-female-female-male sequence with a specific spacing therebetween; and a second die having formed lengthwise thereinto a series of molding portions in female-male-female sequence with a specific spacing therebetween, where the dies can be mutually opened/closed and slid lengthwise a specific distance relative to each other;

said manufacturing method comprising following steps:
  a die clamping step for closing and clamping the first and second dies; an injection step following the die clamping step for molding first and second half bodies for a present cycle in a combination of male and female molding portions by injecting molten resin to a molding cavity formed between the dies, and for joining first and second half bodies from a preceding cycle in a combination of female molding portions by injecting molten resin between their abutting portions, wherein there is only one injection means;
  a removal step following the injection step for opening the first and second dies and removing a hollow member constituted by joining the half bodies from the previous cycle; and
  a die sliding step following the injection step for sliding the first and second dies lengthwise a specific distance relative to each other in a direction opposite that in which the dies were slid in the previous cycle;
  and repeating these steps to manufacture one hollow member constituted by joining first and second half bodies each time the dies are slid relative to each other.

2. A molding apparatus for manufacturing a synthetic resin hollow member by bringing a pair of synthetic resin-made half bodies into abutment each other and joining the half bodies together at their abutting portions comprising:
  a first die having formed lengthwise thereinto a series of molding portions in male-female-female-male sequence with a specific spacing therebetween;
  a second die having formed lengthwise thereinto a series of molding portions in female-male-female sequence with a specific spacing therebetween;
  a die opening and closing means for opening and closing the first and second dies to each other;
  a sliding means for sliding the first and second dies lengthwise a specific distance relative to each other;
  an injection means for injecting molten resin into a plurality of molding cavities formed between the closed first and second dies, wherein there is only one injection means;
  where an injection molding is carried out at each relative sliding operation of the dies, by which first and second half bodies for a present cycle are molded in a combination of male and female molding portions, and first and second half bodies from a preceding cycle are joined together by injecting molten resin between their abutting portions in a combination of female molding portions, and one hollow member constituted by joining first and second half bodies is manufactured at each relative sliding operation of the dies.

3. A manufacturing method for manufacturing a synthetic resin hollow member having an intermediate element incorporated therein by bringing a pair of synthetic resin-made half bodies into abutment with each other after disposing the intermediate element therebetween, and then joining the mated half bodies at their abutting portions, using a die slide injection molding apparatus comprising:
  a first hollow member die having formed lengthwise thereinto a series of molding portions in male-female-female-male sequence with a specific spacing therebetween; a first intermediate element die having an intermediate element molding portion and disposed at an end of the first hollow member die; a second hollow member die having formed lengthwise thereinto a series of molding portions in female-male-female sequence with a specific spacing therebetween; and a second intermediate element die having an intermediate element molding portion and disposed at an end of the second hollow member die, where the first and second hollow member dies can be mutually opened/closed and slid lengthwise a specific distance relative to each other, and the first and second intermediate element dies are openable and closable to each other but not slideable;

said manufacturing method comprising following steps:
  a die clamping step for closing and clamping the first and second hollow member dies and first and second intermediate element dies respectively;
  an injection step following the die clamping step for injecting molten resin into molding cavities formed between the hollow member dies and intermediate element dies respectively, thereby forming first and second molding half bodies for a present cycle in a combination of male and female molding portions, and an intermediate element for the present cycle in a combination of the intermediate element molding portions, and joining first and second molding half bodies from a preceding cycle in a combination of female molding portions by injecting molten resin between their abutting portions, wherein there is only one injection means;
  a removal step following the injection step for opening the hollow member dies and removing the hollow member formed by joining half bodies from the previous cycle after assembling therebetween an intermediate element from the previous cycle;
  an intermediate element assembly step for assembling an intermediate element molded for the present cycle to either the first or second half body for the present cycle;
  a die sliding step for sliding the first and second hollow member dies lengthwise a specific distance relative to each other in a direction opposite that in which the dies were slid in the previous cycle;
  and repeating these steps to manufacture one hollow member constituted by joining first and second half bodies after assembling therebetween an intermediate element each time the dies are slid relative to each other.

4. A molding apparatus for manufacturing a synthetic resin hollow member having a intermediate element incorporated therein by bringing a pair of synthetic resin half bodies into abutment after disposing the intermediate element therebetween, and then joining the mated half bodies at their abutting portions, comprising:
  a first hollow member die having formed lengthwise thereinto a series of molding portions in male-female-female-male sequence with a specific spacing therebetween;
  a first intermediate element die having an intermediate element molding portion and disposed at an end of the first hollow member die;
  a second hollow member die having formed lengthwise thereinto a series of molding portions in female-male-female sequence with a specific spacing therebetween; and
  a second intermediate element die having an intermediate element molding portion and disposed at an end of the second hollow member die;

a die opening and closing means for opening and closing respectively the first and second hollow member dies and first and second intermediate element dies to each other;

a sliding means for sliding the hollow member dies lengthwise a specific distance relative to each other while holding the intermediate element dies without sliding; and an injection means for injecting molten resin into a plurality of molding cavities formed between the closed dies, wherein there is only one injection means;

where an injection molding step is carried out at each relative sliding operation of the dies, by which first and second molding half bodies for a present cycle are molded in a combination of male and female molding portions, an intermediate element for the present cycle is molded in a combination of the intermediate element molding portions, and first and second half bodies from a preceding cycle are joined together by injecting molten resin between their abutting portions in a combination of female molding portions, and one hollow member constituted by joining first and second half bodies after assembling therebetween an intermediate element is manufactured at each relative sliding operation of the dies.

5. A manufacturing method for manufacturing a synthetic resin hollow member using a die slide injection molding apparatus comprising a first die having formed lengthwise thereto a series of molding portions in male-female-female-male sequence with a specific spacing therebetween, and a second die having formed lengthwise thereto a series of molding portions in female-male-female sequence with a specific spacing therebetween, where the dies can be mutually opened/closed and slid lengthwise a specific distance relative to each other;

said manufacturing method comprising following steps:
a first die clamping step for closing and clamping the first and second dies;

a first injection step following the first die clamping step for molding third and fourth half bodies for a present cycle in a combination of male and female molding portions by injecting molten resin into a cavity formed between the dies, and joining together first and second half bodies from a preceding cycle in female molding portions by injecting molten resin between their abutting portions;

a first removal step following the first injection step for opening the dies and removing a first hollow member formed by joining the first and second half bodies from the previous cycle;

a first die sliding step following the first injection step for sliding the dies lengthwise a specific distance relative to each other in a direction opposite that in which the dies were slid in the previous cycle;

a second die clamping step for closing and clamping the first and second dies after the first die sliding step;

a second injection step following the second die clamping step for molding first and second molding half bodies for the present cycle in a combination of male and female molding portions by injecting molten resin to a molding cavity formed between the dies, and for joining together third and fourth half bodies from the present cycle in a combination of female molding portions by injecting molten resin to their abutting portions;

a second removal step following the second injection step for opening the dies and removing a second hollow member formed by joining the third and fourth half bodies from the present cycle; and a second die sliding step following the second injection step for sliding the dies lengthwise a specific distance relative to each other in a direction opposite that in which the dies were slid in the first sliding step;

and repeating these steps to sequentially manufacture one hollow member of joined first and second half bodies and one hollow member of joined third and fourth half bodies every two times the dies are slid relative to each other, wherein there is only one injection means.

6. A molding apparatus for manufacturing a synthetic resin hollow member, comprising:

a first die having formed lengthwise thereinto a series of molding portions in male-female-female-male sequence with a specific spacing therebetween;

a second die having formed lengthwise thereinto a series of molding portions in female-male-female sequence with a specific spacing therebetween, where the center male molding portion can be used in combination with each of the two center female molding portions in the first die;

a die opening and closing means for opening and closing the first and second dies to each other;

a sliding means for sliding the first and second dies lengthwise a specific distance relative to each other; and an injection means for injecting molten resin into a plurality of molding cavities formed between the closed first and second dies, wherein there is only one injection means;

wherein at every two relative sliding operations of the first and second dies, a first injection molding step and a second injection molding step are performed, the first injection molding step comprising molding third and fourth molding half bodies for a present cycle in a combination of male and female molding portions by injecting molten resin to a cavity formed between the dies, and jointing first and second molding half bodies from a preceding in a combination of female molding portions by injecting molten resin between their abutting portions; and the second injection molding step comprising molding first and second half bodies for the present cycle in a combination of male and female molding portions by injecting molten resin to a cavity formed between the dies, and jointing third and fourth half bodies for the present cycle in a combination of female molding portions by injecting molten resin between their abutting portions;

thereby yielding a first hollow member of joined first and second half bodies and a second hollow member of joined third and fourth half bodies, at every two relative sliding operations of first and second dies.

* * * * *